US009788053B2

(12) United States Patent
Phillips et al.

(10) Patent No.: US 9,788,053 B2
(45) Date of Patent: Oct. 10, 2017

(54) FAST CHANNEL CHANGE IN A MULTICAST ADAPTIVE BITRATE (MABR) STREAMING NETWORK USING HTTP DOWNLOAD SEGMENT RECOVERY IN A DEDICATED BANDWIDTH PIPE

(71) Applicant: Ericsson AB, Stockholm (SE)

(72) Inventors: Chris Phillips, Hartwell, GA (US); Jennifer Ann Reynolds, Duluth, GA (US); Robert Hammond Forsman, Sugar Hill, GA (US)

(73) Assignee: ERICSSON AB, Stockholm (SE)

(*) Notice: Subject to any disclaimer, the term of this patent is extended or adjusted under 35 U.S.C. 154(b) by 5 days.

(21) Appl. No.: 14/848,638

(22) Filed: Sep. 9, 2015

(65) Prior Publication Data
US 2017/0070773 A1 Mar. 9, 2017

(51) Int. Cl.
H04N 7/173 (2011.01)
H04N 21/438 (2011.01)
(Continued)

(52) U.S. Cl.
CPC ..... H04N 21/4384 (2013.01); H04N 21/2183 (2013.01); H04N 21/2385 (2013.01); H04N 21/2662 (2013.01); H04N 21/4302 (2013.01); H04N 21/44209 (2013.01); H04N 21/4621 (2013.01); H04N 21/6125 (2013.01); H04N 21/6373 (2013.01); H04N 21/64322 (2013.01); H04N 21/845 (2013.01); H04N 21/85406 (2013.01)

(58) Field of Classification Search
CPC ......... H04N 21/4384; H04N 21/64322; H04N 21/2662; H04N 21/6125; H04N 21/2385; H04N 21/4302; H04N 21/2183; H04N 21/85406
USPC ....................................................... 725/109
See application file for complete search history.

(56) References Cited

U.S. PATENT DOCUMENTS 8,014,393 B1 * 9/2011 Faheem .................. H04L 47/15
370/390
8,355,450 B1 1/2013 Eshet et al.
(Continued)

FOREIGN PATENT DOCUMENTS

WO WO 01/62008 A1 8/2001
WO WO 2014/063726 A1 5/2014
(Continued)

OTHER PUBLICATIONS

Fuchs, et al.: "Optimizing channel change time in IPTV applications". 2008, Piscataway, NJ.

Primary Examiner — Michael B Pierorazio

(57) ABSTRACT

A system and method for effectuating channel changes in a multicast adaptive bitrate (MABR) streaming network using a dedicated bandwidth pipe for downloading a requested channel's data in a recovery segment by issuing an HTTP request. A video management agent is configured to stitch the recovery segment's data with the regular channel stream during the channel change to generate a hybrid stream, which is multicast streamed toward the requesting device. Once the data from the regular channel stream is properly joined, recovery segment downloading ceases and the bandwidth consumed for sending recovery data in the dedicated bandwidth pipe is released.

23 Claims, 20 Drawing Sheets

(51) Int. Cl.
*H04N 21/61* (2011.01)
*H04N 21/2662* (2011.01)
*H04N 21/43* (2011.01)
*H04N 21/854* (2011.01)
*H04N 21/643* (2011.01)
*H04N 21/2183* (2011.01)
*H04N 21/2385* (2011.01)
*H04N 21/442* (2011.01)
*H04N 21/462* (2011.01)
*H04N 21/6373* (2011.01)
*H04N 21/845* (2011.01)

(56) References Cited

U.S. PATENT DOCUMENTS

| | | | | |
|---|---|---|---|---|
| 8,762,564 B1* | 6/2014 | Philpott | | H04L 65/4084 |
| | | | | 709/217 |
| 9,219,940 B2* | 12/2015 | Gaillard | | H04N 21/23106 |
| 9,264,508 B2* | 2/2016 | Wolf | | H04L 67/2842 |
| 2004/0172478 A1 | 9/2004 | Jacobs et al. | | |
| 2008/0037420 A1* | 2/2008 | Tang | | H04L 1/1607 |
| | | | | 370/229 |
| 2009/0100459 A1* | 4/2009 | Riedl | | H04N 21/2385 |
| | | | | 725/35 |
| 2009/0150943 A1* | 6/2009 | Vasudevan | | H04N 21/2385 |
| | | | | 725/86 |
| 2010/0086020 A1* | 4/2010 | Schlack | | H04L 67/322 |
| | | | | 375/240.01 |
| 2010/0115099 A1 | 5/2010 | Gu et al. | | |
| 2011/0109808 A1 | 5/2011 | Li et al. | | |
| 2011/0188439 A1* | 8/2011 | Mao | | H04N 7/17318 |
| | | | | 370/312 |
| 2011/0197239 A1* | 8/2011 | Schlack | | H04L 41/0896 |
| | | | | 725/95 |
| 2011/0255555 A1* | 10/2011 | Alexander | | H04N 21/23805 |
| | | | | 370/468 |
| 2012/0259994 A1 | 10/2012 | Gillies et al. | | |
| 2012/0331513 A1* | 12/2012 | Yamagishi | | H04N 21/2362 |
| | | | | 725/95 |
| 2013/0091521 A1* | 4/2013 | Phillips | | H04N 21/23424 |
| | | | | 725/35 |
| 2013/0132986 A1* | 5/2013 | Mack | | H04L 65/605 |
| | | | | 725/14 |
| 2014/0074988 A1* | 3/2014 | Parekh | | H04N 21/23424 |
| | | | | 709/219 |
| 2014/0075042 A1 | 3/2014 | Giladi | | |
| 2014/0150046 A1* | 5/2014 | Epstein | | H04N 21/23439 |
| | | | | 725/126 |
| 2014/0189754 A1* | 7/2014 | Major | | H04L 65/4076 |
| | | | | 725/67 |
| 2014/0230003 A1* | 8/2014 | Ma | | H04N 21/231 |
| | | | | 725/115 |
| 2014/0282766 A1* | 9/2014 | Good | | H04L 65/607 |
| | | | | 725/93 |
| 2014/0282777 A1* | 9/2014 | Gonder | | H04L 65/605 |
| | | | | 725/109 |
| 2015/0043379 A1* | 2/2015 | Shimokuni | | H04L 45/586 |
| | | | | 370/254 |
| 2015/0358662 A1* | 12/2015 | Drouin | | H04N 21/2668 |
| | | | | 725/97 |

FOREIGN PATENT DOCUMENTS

WO    WO 2014/204366 A1    12/2014
WO    WO 2015/001985 A1    8/2015

* cited by examiner

FAST CHANNEL CHANGE IN A MULTICAST ADAPTIVE BITRATE (MABR) STREAMING NETWORK USING HTTP DOWNLOAD SEGMENT RECOVERY IN A DEDICATED BANDWIDTH PIPE

FIELD OF THE DISCLOSURE

The present disclosure generally relates to communication networks. More particularly, and not by way of any limitation, the present disclosure is directed to a channel change system and method in a multicast adaptive bitrate (MABR) streaming network.

BACKGROUND

The near universal adoption of Internet protocol (IP) as a standard for digital transmission is revolutionizing the traditional way of video delivery. Typical applications such as IPTV and live video streaming have become increasingly popular over the Internet. To efficiently utilize the bandwidth resources of the network in these applications, the video is usually compressed with suitable media coding schemes and then delivered only to subscribers who request it. For data delivery, multicast is considered the most efficient paradigm for such applications, but the scalability issue of traditional IP multicast hinders the deployment of a large-scale video delivery system with numerous channels.

The time it takes for a new program channel to start playing from the time a request to change to that channel is issued is a critical quality of experience (QoE) metric for multicast IPTV systems. Typical solutions to address channel changing in an IPTV environment involve unicasting a full-quality boost stream, or a portion thereof, replicated from a dedicated server provided for each service channel. However, such solutions can impose significant resource demands on the networks and associated streaming server infrastructure, thereby negatively impacting scalability. Other solutions focus on generating low-quality streams, composed of just I-frames or several low resolution channels, to accompany the regular channel stream. These mechanisms may engender noticeable picture inconsistency at each channel changing act, thereby degrading QoE to unacceptable levels.

Further, consumers are increasingly expecting flexible behavior from their video services, including live and/or on-demand offerings via IPTV platforms, to enhance available viewing options and features. However, traditional multicast environments supporting a single bitrate of content are largely unsuitable for providing a rich user experience.

SUMMARY

The present patent disclosure is broadly directed to systems, methods, apparatuses, devices, and associated non-transitory computer-readable media for facilitating channel changes in an MABR communications network. In one aspect, an embodiment of a channel changing method comprises, inter alia, receiving a channel change (CC) request from a set-top-box (STB) device disposed in a subscriber premises, which may include a plurality of client devices, to change to a target service channel provided as a plurality of MABR streams wherein each MABR stream corresponds to a particular bitrate representation of the target service channel. A determination may be made with respect to selecting a specific bitrate representation of the target service channel to which the requesting STB device is to be switched, e.g., based on QoS, bandwidth constraints, etc. A HyperText Transfer Protocol (HTTP) request is generated to obtain a recovery segment from a cached storage, the recovery segment having a matching bitrate corresponding to the select bitrate representation of the target service channel. The requesting STB device is joined to a multicast ABR stream having the select bitrate representation of the target service channel using the recovery segment downloaded from the cached storage, wherein the recovery segment is transmitted in a dedicated fast channel change (FCC) pipe portion of a subscriber premises bandwidth pipe allocated to the subscriber premises. In a further variation, if the select bitrate representation of the target service channel is not at a correct bitrate quality provisioned for the requesting STB device, at least a portion of the bandwidth of the subscriber premises bandwidth pipe may be (re)allocated to ensure that the correct bitrate quality for the target service channel is reached.

In another embodiment, a channel changing method may further comprise identifying an optimal bitrate representation of the target service channel that allows switching to the target service channel at a highest possible bitrate quality while satisfying a channel change render time threshold within the dedicated FCC pipe portion's bandwidth constraints and choosing the optimal bitrate representation as the select bitrate representation.

In another embodiment, a channel changing method may further comprise receiving the recovery segment data corresponding to the select bitrate representation from a channel change processing element via an HTTP download operation and providing it to a MABR remux entity for immediate transmission to the requesting STB device; receiving a gapped stream of the select bitrate representation of the target service channel from a segmentation and gapping (SAG) unit and, at a matching time code reference point (e.g., a PCR time code for MPEG-TS) between the recovery segment and the gapped stream of the select bitrate representation, terminating the HTTP download operation of the recovery segment and joining the gapped stream of the select bitrate representation; and de-gapping the joined gapped stream of the select bitrate representation for transmission to the requesting STB device.

In another aspect, an embodiment of an apparatus is disclosed for effectuating channel changes in an MABR communications network serving a subscriber premises. The claimed apparatus may comprise, inter alia, a segmenter/gapper (SAG) unit configured to receive a plurality of encoded MABR streams for each service channel from an MABR encoder operative to receive a plurality of service channels, wherein each encoded MABR stream corresponds to a particular bitrate representation of a specific service channel. The segmenter/gapper is further operative to generate a segmented and gapped MABR stream for each encoded MABR stream of each service channel, with an inter-segment gap ranging from a few tens of milliseconds to a few hundreds of milliseconds in one example implementation. A channel change processing element is coupled to the MABR encoder to receive the plurality of encoded MABR streams and is configured to generate and store recovery segments in a cache for each bitrate representation of each service channel, wherein each recovery segment corresponds to a segment of the particular bitrate representation of each service channel being multicast from the SAG unit. An ABR video management agent (VMA) or module is configured to receive the segmented and gapped MABR streams from the segmenter/gapper and is further operative to execute one or more methods set forth herein to effectuate a channel change using a dedicated FCC pipe, responsive to a CC request from an STB disposed in the premises, including generation of HTTP requests to download appropriate recovery segments with respect to a requested target service channel. In one variation, the VMA module may be provided as a virtual machine running on a host platform disposed in the network. In another variation, the VMA module may be co-located at a subscriber premises gateway node.

In still further aspects, one or more embodiments of a non-transitory computer-readable medium containing computer-executable program instructions or code portions stored thereon are disclosed for performing one or more embodiments of the methods set forth herein when executed by a processor entity of a network node, a premises gateway node, an FCC HTTP delivery processor, or in a virtualized environment instantiated on a host machine. Additional features of the various embodiments are as claimed in the dependent claims.

Advantages of the present invention include, but not limited to, the ability to switch or change channels within operator-configured channel render time thresholds in a bandwidth-optimized manner. As the policy management may be configured to handle different service channels based on respective weights and priorities, channel changing operations can take place at the highest bitrate quality possible while still meeting the channel render time requirements. Because the channel changing takes place very rapidly, overall service quality in a network may only be minimally affected. Additional benefits and advantages of the embodiments will be apparent in view of the following description and accompanying Figures.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

DETAILED DESCRIPTION OF THE DRAWINGS

Figure 1A:
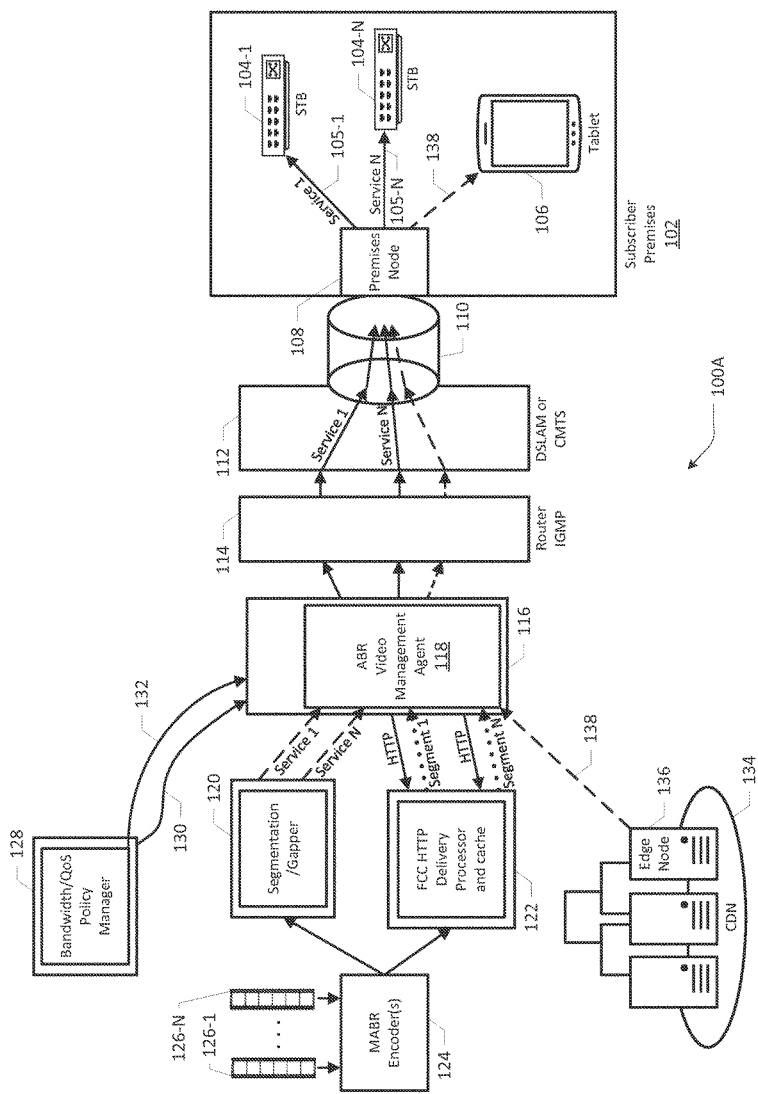
FIG. 1A depicts an example MABR communications network arrangement wherein one or more embodiments of the present patent application may be practiced for effectuating channel change operations with respect to a subscriber station disposed in a subscriber premises.

In the following description, numerous specific details are set forth with respect to one or more embodiments of the present patent disclosure. However, it should be understood that one or more embodiments may be practiced without such specific details. In other instances, well-known circuits, subsystems, components, structures and techniques have not been shown in detail in order not to obscure the understanding of the example embodiments. Accordingly, it will be appreciated by one skilled in the art that the embodiments of the present disclosure may be practiced without such specific components. It should be further recognized that those of ordinary skill in the art, with the aid of the Detailed Description set forth herein and taking reference to the accompanying drawings, will be able to make and use one or more embodiments without undue experimentation.

Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an element, component or module may be configured to perform a function if the element is capable of performing or otherwise structurally arranged to perform that function.

As used herein, a network element or node may be comprised of one or more pieces of service network equipment, including hardware and software that communicatively interconnects other equipment on a network (e.g., other network elements, end stations, etc.), and is adapted to host one or more applications or services with respect to a plurality of subscribers. As such, some network elements may be disposed in a wireless radio network environment whereas other network elements may be disposed in a public packet-switched network infrastructure, including or otherwise involving suitable content delivery network (CDN) infrastructure. Accordingly, some network elements may comprise "multiple services network elements" that provide support for multiple network-based functions (e.g., A/V media delivery policy management, session control and session resource management, Quality of Service (QoS) policy enforcement, bandwidth scheduling management, subscriber/device policy and profile management, content provider priority policy management, streaming policy management, and the like), in addition to providing support for multiple application services (e.g., data and multimedia applications). Example subscriber end stations or client devices may comprise devices configured to tune to multicast service channels that may comprise content delivered via a multicast ABR communications network as well as progressive download ABR clients, HTTP clients, and the like, for receiving content from one or more content providers, e.g., via a broadband access network. Such client devices may therefore include traditional set-top boxes (STBs) with or without integrated cable cards, connected/smart TVs, OTT STBs, personal/digital video recorders (PVR/DVRs), networked media projectors, portable laptops, netbooks, palm tops, tablets, smartphones, Voice Over Internet Protocol (VOIP) phones, mobile/wireless user equipment, portable media players, portable gaming systems or consoles (such as the Wii®, Play Station 3®, etc.), and the like, which may access or consume content/services provided via a suitable delivery pipe provisioned for a subscriber premises (e.g., a home, office, or other facility), including content channels (also referred to as service channels) delivered in a suitable MABR network architecture for purposes of one or more embodiments set forth herein.

One or more embodiments of the present patent disclosure may be implemented using different combinations of software, firmware, and/or hardware. Thus, one or more of the techniques shown in the Figures (e.g., flowcharts) may be implemented using code and data stored and executed on one or more electronic devices or nodes (e.g., a subscriber client device or end station, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such network elements may typically include a set of one or more processors coupled to one or more other components, such as one or more storage devices (e.g., non-transitory machine-readable storage media) as well as storage database(s), user input/output devices (e.g., a keyboard, a touch screen, a pointing device, and/or a display), and network connections for effectuating signaling and/or bearer media transmission. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device or network element may be configured to store code and/or data for execution on one or more processors of that element, node or electronic device for purposes of implementing one or more techniques of the present disclosure.

Referring now to the drawings and more particularly to FIG. 1A, depicted therein is an example MABR communications network environment 100A wherein one or more embodiments of the present patent application may be practiced for effectuating fast channel change (FCC) operations with respect to a subscriber station (e.g., an STB configured to receive multicast content, with or without rate adaptation) disposed in a subscriber premises 102. In the context of the present disclosure, the MABR communications network environment 100A may implemented as an end-to-end network architecture for delivering MABR media content (and advertisement content, where applicable) using any delivery infrastructures, e.g., a Digital Subscriber Line (DSL) architecture, a Data Over Cable Service Interface Specification (DOCSIS)-compliant Cable Modem Termination System (CMTS) architecture, a suitable satellite access architecture or a broadband wireless access architecture. By way of example and introduction, MABR streaming delivery is broadly set forth herein that is applicable to both DSL and DOCSIS architectures without necessarily being limited thereto. As will be seen below, content may be delivered using either multicast ABR techniques or unicast ABR techniques. In a unicast delivery, a subscribing receiver may be provided with a direct and unique two-way path through the delivery network all the way back to a serving media server supplying the required data stream. The main streaming activity is managed on a one-to-one basis between the receiver and the source server in a communication session. The network between the source server and receiver may typically comprise a series of intermediate servers installed at network nodes, which may not be directly involved in the service but only support the transfer of a packet stream. Typically, the protocols used to support the transmissions are simple forms of Internet Protocol (IP) itself augmented by one or more higher layer protocols to provide flow control. These protocols extend across the span of the network connection between the source server and a given receiver.

A unicast system can support ABR streaming, which allows some form of rate adaptation. A given service may be encoded at a selection of different bitrates (known as representations), with synchronised boundary points at defined locations (e.g., every 50 frames). For each representation, content between successive boundary points is converted into a discrete file. Clients fetch a segment of one of the representations in turn. If a higher or a lower bit rate is required, the next segment is fetched from one of the other representations. The segments are constructed such that there is no discontinuity in decoded pictures/audio if the client switches between representations at the boundary points. This system may require a unicast two-way path between source and receiver to request files and deliver the requested files.

Multicast delivery makes more efficient use of bandwidth by sharing content streams among several receivers. Intermediate network elements (e.g., routers or switches) are now more closely involved in the service delivery such that some control and management functions are delegated from the source server. This control is supported by more extensive protocols devised for this type of application such as, e.g., Protocol Independent Multicast (PIM) and Internet Group Multicast Protocol (IGMP). When a receiver requests a given media item, the network router system finds an existing stream of that content already in the network and directs a copy of it to that receiver from a serving cable headend, a video head office or an appropriately proximal network node in an edge distribution network. The requesting receiver may be provided with the capability to join this existing stream under controlled conditions that do not adversely affect existing receivers. Any receiver in this group may also be provided with the ability to leave the stream, or pause its consumption, without affecting the others. Additionally, there may be an implementation where a video pipe delivering services to a premises is operative to deliver content to one or more progressive download clients of the premises that are designed to receive the video in bursts.

Subscriber premises 102, which is served by a suitable broadband pipe 110, is illustratively shown as having a plurality of streaming devices, e.g., STB 104-1 to STB 104-N, that may consume multicast content and effectuate channel changes in accordance with an embodiment of the present patent application, wherein an STB may be respectively coupled to or otherwise integrated with at least one display device (not specifically shown). In general, STBs 104-1 to 104-N may be configured to operate with one or more coder-decoder (codec) functionalities based on known or hereto unknown standards or specifications including but not limited to, e.g., Moving Pictures Expert Group (MPEG) codecs (MPEG, MPEG-2, MPEG-4, etc.), H.264 codec, High Efficiency Video Coding or HEVC (H.265) codec, and the like, in order to receive and render various programming content that is delivered as a plurality of service channels. Further, in certain implementations, subscriber premises 102 may also include one or more progressive download clients such as, e.g., smartphones, computers, gaming devices or consoles, OTT STBs or tablets, etc., collectively referred to by reference numeral 106. A premises network (not explicitly shown), which may be implemented using any suitable wireless or wireline network technologies, may therefore comprise network paths or pipes 105-1 to 105-N for streaming service channel content to respective STBs 104-1 to 104-N, as well as one or more paths or pipes 138 for effectuating segment pulls from the ABR clients via a shared progressive download pipe from with respect to content provided from an edge node 136 of a content delivery network (CDN) 134. Although not specifically shown in FIG. 1A, it should be appreciated that premises 102 may also include other devices that may consume bandwidth for other data and voice communications. Accordingly, the total bandwidth of subscriber premises pipe 110 may be apportioned between or allocated to a virtual video pipe for streaming of managed service channels, a shared video pipe portion for servicing progressive download clients where present (i.e., progressive ABR download pipe), in addition to data and voice pipes. Furthermore, as will be set forth in detail further below, a portion of the video pipe may be dedicated to effectuating channel changes according to certain embodiments of the present invention.

In an example implementation, subscriber premises 102 may be served via an access network architected over DSL infrastructure or DOCSIS-compliant CMTS infrastructure. Accordingly, the subscriber premises bandwidth pipe 110 may be disposed between subscriber premises 102 and an access node 112 such as a DSL Access Multiplexer (DSLAM) node or a CMTS node, wherein a suitable premises node or element 108 such as a DSL router/gateway or a cable modem is operative to effectuate communications (including bearer and signaling traffic) with respect to the client devices of the premises. A suitable IGMP switch or router 114 (e.g., IGMPv2/v3-capable Gigabit Ethernet (GigE) multicast router) is coupled to the access node 112 for effectuating suitable IGMP Leave/Join messages, in conjunction with additional functionalities or structures set forth in detail further below, with respect to joining, leaving or changing various multicast streams corresponding to the service channels available to STBs 104-1 to 104-N of the subscriber premises 102.

One or more ABR encoders 124, which may be provided as part of a multicast stream formation (MSF) functionality in one example embodiment, are operative to receive a plurality of channel source feeds 126-1 to 126-N corresponding to a group of service channels that may be provided as MABR channels having segmented streams at different bitrate representations as will be described in detail below. Typically, the ABR encoder 124 receives live feeds from appropriate communications networks, although it is possible in an alternative or additional arrangement for a file-based streamer to read the content files from a disk and stream the content streams via a network to the ABR encoder 124. Accordingly, the channel source feeds may comprise a variety of content or programs, e.g., pay TV broadcast programs delivered via cable networks or satellite networks, free-to-air satellite TV shows, IPTV programs, time-shifted TV (TSTV) content, and the like. Regardless of how channel source feeds are generated and provided to the ABR encoder 124, a segmentation and gapping (SAG) unit 120 is configured to receive a plurality of encoded MABR streams for each service channel from the MABR encoder 124. As noted, each encoded MABR stream corresponds to a particular bitrate representation (e.g., 10 Mbs to 500 Kbs that correspond to various levels of video quality or resolutions) of a specific service channel to which a subscriber station may tune. SAG element 120 is operative to generate a segmented and gapped MABR stream for each encoded MABR stream of each service channel in a gapping functionality that may also be provided as part of an MSF module or node described in further detail below. A fast channel change processing element (also referred to as FCC HTTP delivery processor) 122 is also adapted to receive the plurality of encoded MABR streams from encoder 124 for generating recovery segments for each bitrate representation of each service channel, wherein each recovery segment corresponds to a segment of the particular bitrate representation of each service channel that is being multicast from SAG 120. Additionally, the FCC HTTP delivery processing entity 122 is operative to transmit particular recovery segments on demand in an HTTP download operation with respect to channel changing requests emanating from STBs as will be set forth in additional detail further below.

In accordance with the teachings of the present invention, an ABR video management agent (VMA) is provided that is configured to receive the segmented and gapped MABR streams for each service channel, as well as recovery segments pursuant to HTTP pulls that are initiated only for channels to which STBs are changing. The ABR VMA functionality is further operative to effectuate channel leaving and joining operations responsive to channel change requests from a subscriber device as well as subscriber bandwidth pipe management policies and channel change render time information provided by a bandwidth/QoS policy manager 128. Broadly, an embodiment of the present invention may be configured to effectuate the following. An encoder feed from ABR encoder 124 enters both SAG 120 (which in one implementation may comprise a traditional gapper used for multicast ABR) and FCC HTTP delivery processor 122 at least substantially at the same time. The bandwidth/QoS policy manager 128 also provides channel render time policy 130 and QoS/pipe management policy 132 to MABR-VMA (also referred to herein as MVMA node, element or functionality). If there are any nontraditional clients (e.g., progressive ABR download clients, non-STB clients, etc.) also disposed in the subscriber premises, content segments for such devices may also be fed into the MVMA functionality, as exemplified by progressive download pull path 138 from CDN edge node 136. Appropriate service logic executing at MVMA is operative to generate HTTP pull requests for downloading recovery segments from the FCC HTTP download processor 122 (which may also receive suitable MABR management policies) as fast as possible, which recovery segments correspond to the segments of particular bitrate representations of the service channels to which STBs may change by issuing appropriate channel changing requests via the premises nodes associated therewith. MVMA functionality is also configured to handle stitching of recovery segment content and the service channel content and pass the hybrid stream, along with any unmodified content, downstream towards the end clients. The hybrid stream may be multicast out at a constant rate, or faster at first in order to quickly fill the client's buffer at a requesting STB. Depending on implementation, one arrangement may involve providing the MVMA functionality at a location upstream from IGMP router 114. Further, in such an arrangement (also referred to as "network agent implementation"), the MVMA functionality may be provided as a virtual machine function (i.e., in a virtualized environment running on a physical/hardware platform) instantiated at a network node or element. In an alternative arrangement, the MVMA functionality may be provided at the premises gateway (also referred to as "gateway agent implementation"). In a still further arrangement, the MVMA functionality may be provided at a CDN edge node. Regardless of where it is implemented, the MVMA functionality has the overall responsibility for joining a requested multicast service channel and recovery segment stream at an appropriate timing reference point in order to effectuate a channel change request in an optimal manner.

One skilled in the art will recognize that a network agent implementation is illustrated in FIG. 1A, wherein a service node 116 having the MVMA functionality 118 is disposed north of IGMP router 114 (i.e., toward the network core). Accordingly, in this implementation, stitched multicast streams for the service channels are passed through the IGMP router 114, access node 112, and ultimately to the requesting STB via the premises node 108. In the arrangement shown in FIG. 1B, an example MABR communications network environment 100B is illustrative of a gateway agent implementation, wherein a premises node 152 includes appropriate MVMA service logic 153 for performing the stitching operations. This architecture allows for stitching recovery segments with the regular multicast streams at the last possible moment, but requires the HTTP downloads of recovery segments (as well as segmented and gapped MABR streams in multiple bitrate representations) to be traversed through IGMP router 114 and access node 112, all the way to the premises node 152. Because of the need for the streams to traverse a greater distance in the network, issues such as possible network contention may arise in this arrangement, in addition to being less scalable, although faster rendering of content to progressive download clients may be feasible. On the other hand, in the network agent implementation shown in FIG. 1A, the placement of the MVMA functionality 116 closer to the SAG functionality 120 and FCC HTTP delivery processing functionality 122 allows the least amount of network bandwidth to be used for HTTP downloads of recovery segments via appropriately formatted request/pull messaging mechanisms, although it requires stitching to happen fairly early on.

Figure 15:
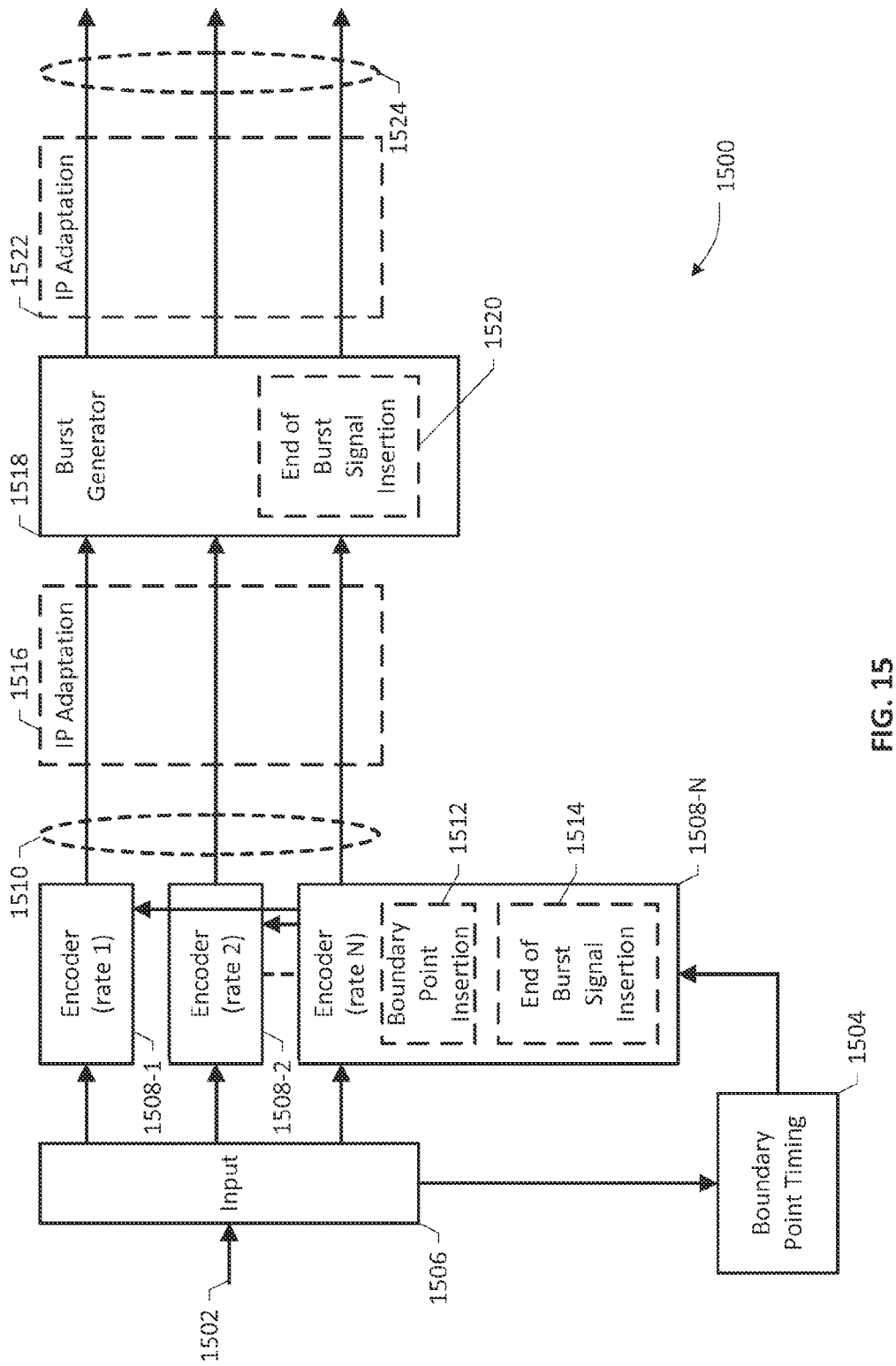
FIG. 15 depicts a block diagram of an apparatus for segmenting media/content channels according to an embodiment of the present patent application.

Regardless of where an example MVMA node is implemented, it is required to receive segmented/gapped MABR streams corresponding to the multicast service channels from SAG functionality 120. Furthermore, SAG functionality 120 and encoder functionality 124 may be combined into an MSF functionality as noted above. Attention is now directed to FIG. 15 that depicts a block diagram of an apparatus 1500 operative as a multicast ABR encoder and gapper for segmenting or packaging content channels according to an embodiment of the present patent application. Apparatus 1500 is advantageously configured for creating a set of segmented stream representations and forming bursts with respect to a media service, which segmented streams may be provided with suitable inter-segment gaps that allow channel operations such as channel joining, channel leaving, switching, splicing in or splicing out, channel (re)multiplexing, de-gapping, etc. as part of downstream operations (e.g., at MVMA functionality 118, IGMP switch 114, and/or MVMA functionality 153). In an example implementation, apparatus 1500 may receive an input feed 1502 of content per service (e.g., any of channel source feeds 126-1 to 126-N in FIG. 1A or FIG. 1B) at an input block 1506 that fans the feed to a plurality of encoders/transcoders 1508-1 to 1508-N, which generate, in parallel, a set of representations of the content at different bitrates. The representations can differ in video resolution depending on the bitrate of encoding. A timing generator 1504 outputs a signal that determines the boundary point of the segments. For example, this functionality may output a signal once per 50 frames (2 seconds), or at any other suitable time interval. The signal output by generator 1504 is applied to all of the parallel encoders 1508-1 to 1508-N for that service. Advantageously, the set of coders 1508-1 to 1508-N can close a Group of Pictures (GOP) and a boundary point insertion unit 1512 can insert in-band signaling such as a Random Access Point (RAP) and a Boundary Point (BP). The outputs of the set of coders 1508-1 to 1508-N are the set of representations 1510 which have time-aligned and/or frame-aligned segments. The representations 1510 are applied to a burst generator unit 1518 that creates the bursts separated by window periods (e.g., on the order of tens or hundreds of milliseconds). In operation, unit 1518 may be configured to play out data at a higher bit rate than the bit rate at which data was received to create the bursts and is operative to recognize the start and end of segments in the representations 1510 by detecting suitable signaling markers (e.g. the in-band BP signaling inserted by the encoders).

Multicast address information may be added at an IP adaptation stage, which can occur at a network node hosting the MVMA functionality or at a node further downstream. Multicast IP datagrams have a destination IP address that is set to be in a range reserved for multicast. It should be appreciated that the apparatus shown in FIG. 15 can operate on data at one of various possible levels. In one advantageous scheme, data may be encoded into Transport Stream (TS) packets at a normal rate and the burst generator unit 1518 operates on TS packets. Transport Stream packets can be adapted into IP packets before burst generator unit 1518 at adaptation block 1516, or after unit 1518 at adaptation block 1522. Another alternative is to form bursts before any packetization (at TS or IP level), but this may be less desirable.

FIG. 15 further illustrates several possible places where end of burst signaling can be added. Each encoder 1508-1 to 1508-N can include an end of burst signal insertion unit 1514 that adds an information element indicating the end of a burst into the encoded data, which includes a header of the TS packets. Alternatively, the burst generator unit 1518 can include an end of burst signal insertion unit 1520 arranged to insert an information element indicating the end of a burst into each of the bursts. Where end of burst signaling is provided as a multicast (with same or different address), the multicast can be generated at the edge network node.

Figure 1B:
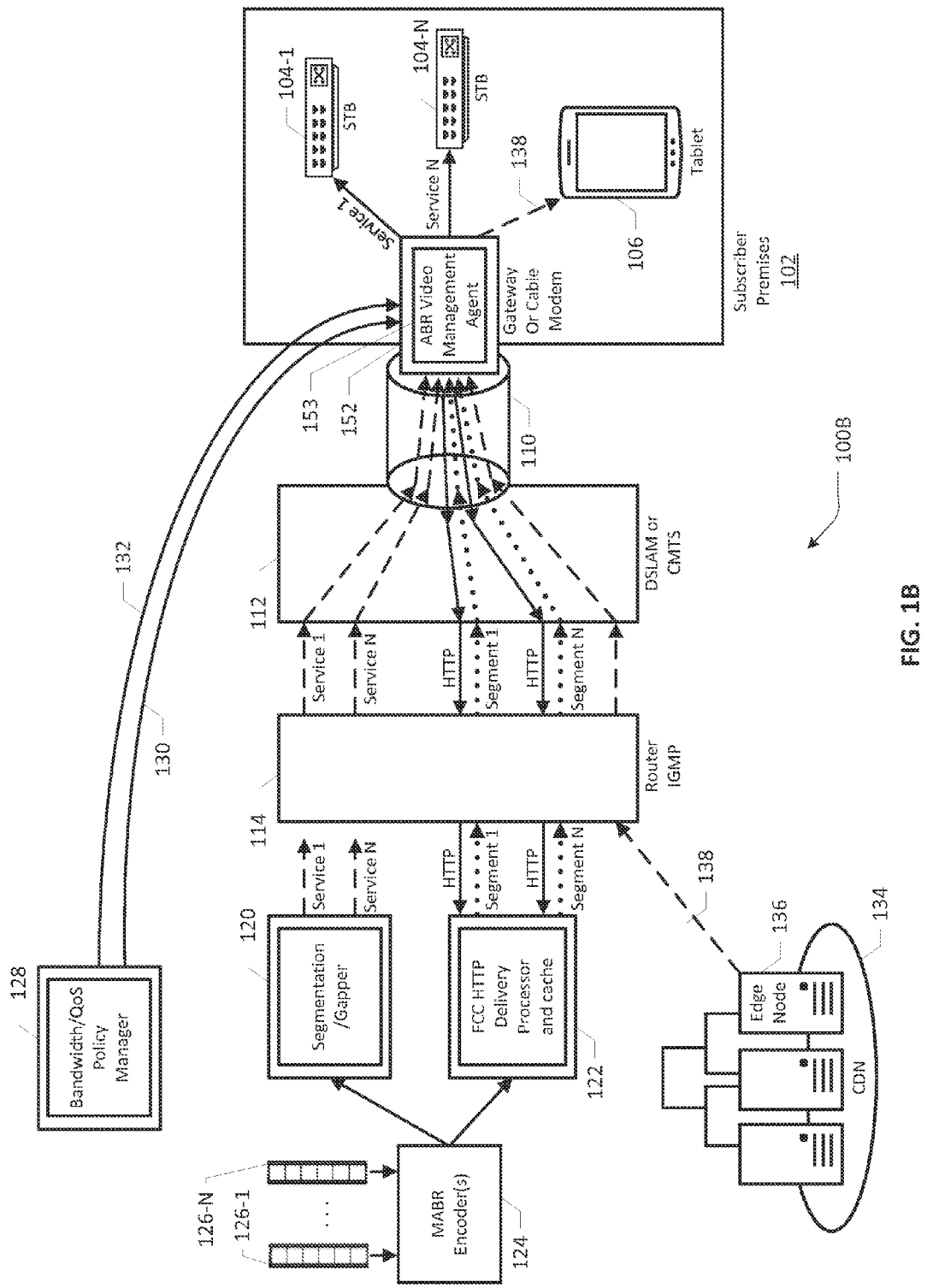
FIG. 1B depicts another example MABR communications network arrangement wherein one or more embodiments of the present patent application may be practiced for effectuating channel change operations with respect to a subscriber station disposed in a subscriber premises.

Typically, a network operator may receive a media content service feed from a service provider, which may then be converted to streams or channels having the right characteristics for the edge distribution network and end users of the network. Although FIG. 15 shows a set of encoders/transcoders 1508-1 to 1508-N configured to operate upon an input data stream 1508 to form the multiple representations at different bitrates, such a stage may be bypassed where a set of representations at different bitrates already exist (e.g., by way of a separate encoder 124 as shown in FIGS. 1A and 1B). Accordingly, it should be understood that multiple representations for a media content service channel can be generated at a point of origin into the MABR communications network or could be supplied by a service provider, wherein the multiple representations can include various definitions, e.g., Standard Definition (SD), High Definition (HD), Ultra HD, etc., of the same content. A skilled artisan will recognize that the duration of the window period (e.g., 200 to 300 milliseconds or thereabouts) introduced in a segmented stream is of sufficient magnitude for a multicast receiver to leave one representation of the stream and join a different representation at a different bitrate or an entirely different media stream, at appropriate stream access points (SAPs), which may be accomplished by issuing appropriate IGMP Leave and Join messages.

A potential consequence of adding window periods or gaps to the transmitted streams is that the flow of content may become jittered beyond the level that normal packet transmission produces. This can be accommodated by buffering provided within an intermediary reception apparatus, e.g., MVMA functionality 118. The window period duration will influence the amount of jitter produced and so there is an optimum size that is related to the worst-case response times of the chain of routers/servers delivering the content. This time is taken for switches to recognize and implement all those steps that are required to keep the stream flowing, including the potential need for the multicast content to be found at or near the source server. For segment durations of the order of about 2 seconds, a possible value of the window period is around 330 milliseconds. The window size is a function of the responsiveness of the network to support multicast Leave and Join functions and it will be appreciated that the window period can be modified to a higher or lower value. More generally, the window period could have a value selected from the range of 0.1 ms and 10 seconds and, more advantageously, the range 10 ms-350 ms. As switches and routers increase in performance, it is possible that the window duration can be reduced to the lower end of the ranges stated above. In one implementation of the MVMA functionality, a 300 ms gap and 1-segment buffer may allow MVMA 118 (or MVMA 153 in a gateway agent implementation) to perform IGMP Leave and Join operations for seamless stitching of regular multicast service channel content and recovery segments with respect to a channel change request from an end subscriber station. Whereas the segmented/gapped MABR streams for various service channels are received at receive ports of the MVMA node with multicast addresses changing on the fly, the downstream port addresses are fixed, corresponding the various service channels, to which IGMP Join operations are ultimately propagated from the subscriber stations. Additional details regarding multicast segmented stream formation and channel joining/leaving techniques may be found in commonly owned PCT Application No. PCT/EP2012/070960, titled "A METHOD AND APPARATUS FOR DISTRIBUTING A MEDIA CONTENT SERVICE", filed Oct. 23, 2012, in the name(s) of Anthony Richard Jones, now published as WO2014/063726, incorporated by reference herein.

Figure 2:
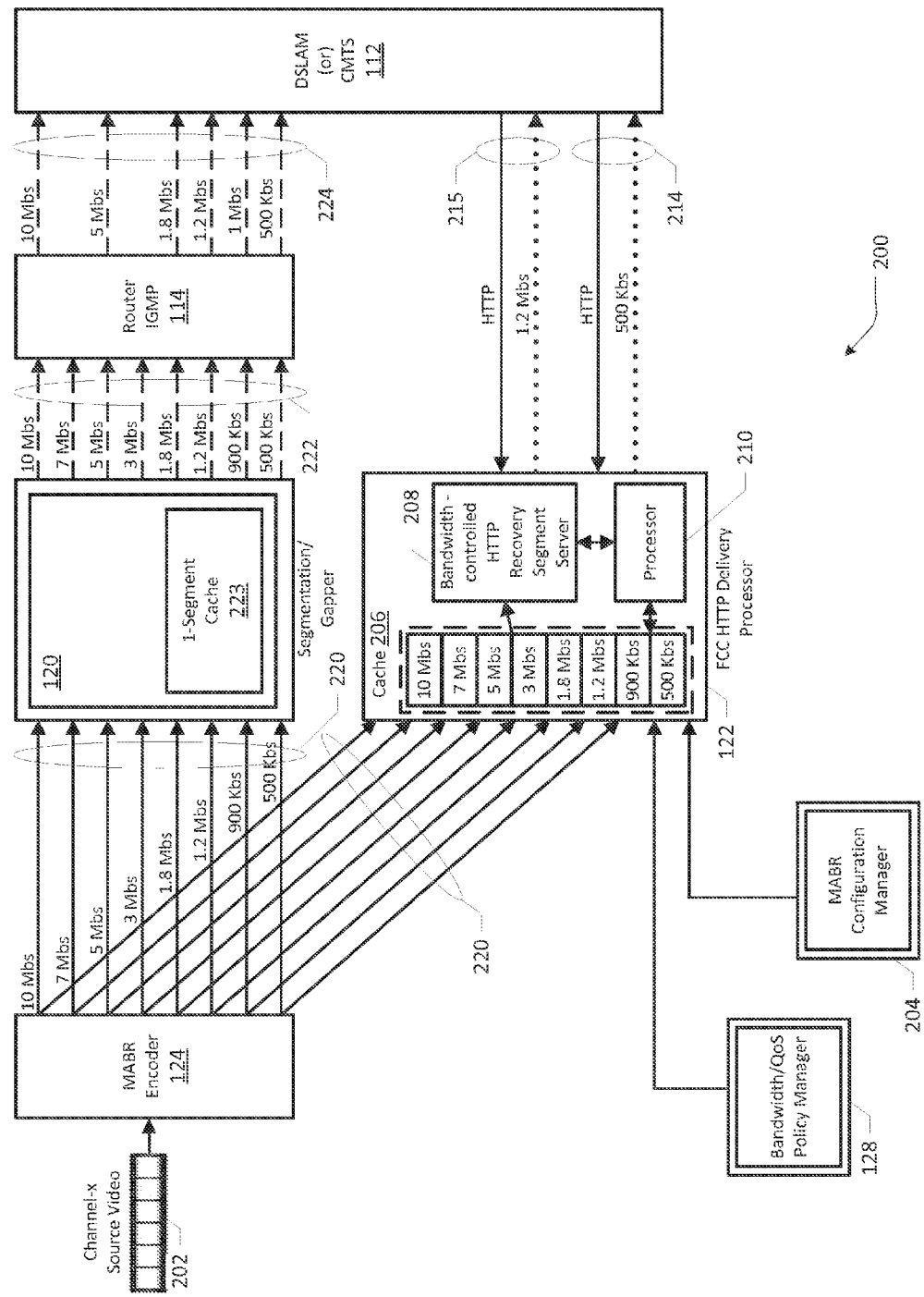
FIG. 2 depicts a network portion or subsystem that may be arranged as an apparatus for effectuating fast channel changes in an MABR communications network arrangement of FIG. 1A or FIG. 1B according to one embodiment.

FIG. 2 depicts a network portion or subsystem 200 that may be arranged as an apparatus for effectuating fast channel changes in an MABR communications network arrangement of FIG. 1A or FIG. 1B according to one embodiment. In particular, subsystem 200 shows further details of an example implementation of SAG functionality 120 that is operative to generate ~300 ms gaps between SAPs of two segments (i.e., inter-SAP gap) as well as an example implementation of FCC HTTP delivery processor 122 that includes a bandwidth controlled HTTP recovery segment server 208 for transmitting recovery segments at appropriate bitrates corresponding to the bitrate representations of target service channels that will be joined by the MVMA functionality. Both SAG 120 and FCC HTTP delivery processor 122 receive multiple bitrate representations of a particular service channel feed 202 that is encoded at, e.g., 10 Mbs to 500 Kbs, as exemplified by reference numeral 220. When data comes into the segmenter/packager, instead of transmitting it out immediately, a segment is harvested and cached, e.g., at a segment cache 223 that contains one full segment for each bitrate and for each multicast service. Likewise, a segment caching process is also performed by the FCC HTTP delivery processor 122, which may receive channel change render time information from the bandwidth/QoS policy manager 128 in an example embodiment. Further, a MABR configuration manager 204 is operative to identify to both SAG 120 and FCC HTTP delivery processor 122 a set of services with multicast addresses and applicable bitrates. The MABR configuration manager 204 may also be operative to provide, define or otherwise obtain a mapping relationship between channel source MABR stream addresses and gapped streams' multicast addresses, which information may be retrieved by FCC HTTP delivery processor 122 to effectuate its initialization, configuration and setup. Because of the caching process at FCC HTTP delivery processor 122, a segment cache 206 is populated with one full segment for each bitrate and for each multicast service. While one segment of a regular multicast gapped channel is being streamed from SAG 120, the same segment is cached in a suitable storage under appropriate service logic executed by a processor of 210 of FCC HTTP delivery processing functionality 122. An HTTP recovery segment server 208 is also operative under appropriate service logic to effectuate on-demand segment downloads to an MVMA functionality (either in a network agent implementation or in a gateway agent implementation) of applicable recovery segments responsive to suitably formatted HTTP request/pull operations. It should therefore be appreciated that recovery segments (or associated HTTP pulls) are not constantly transmitted, in contrast to the segmented/gapped bit streams of the service channels that are constantly multicast streamed from SAG 120. In one example embodiment (e.g., in a gateway agent implementation), the delivery of recovery segments may be bandwidth-controlled or otherwise throttled because of the bandwidth constraints of the access network infrastructure (e.g., from DSLAM/CMTS node to the premises). In a network agent implementation, however, there may not be a need for bandwidth throttling of HTTP downloads since the operator network is not usually bandwidth limited.

In one embodiment, SAG 120 may be configured to transmit all possible bitrates for services that are identified as multicast services to the next element downstream as per the standard multicast operations. Where the MVMA functionality is embodied in a network agent implementation, it is typically the downstream recipient of the regular multicast gapped/segmented streams 222. Since it is also the initiator of HTTP pull operations with respect to recovery segments corresponding to the target service channel to which an STB switches, it is the recipient of the downloaded recovery segments that match the particular bitrate representation of a requested target service channel. In a gateway agent implementation, the multicast gapped/segmented streams 222 are provided to the IGMP router 114, as shown in the illustrative arrangement of FIG. 2, wherein the IGMP router 114 may pass along streams for only those channels that are active, as shown by example downstream bitrate representations 224 propagating towards DSLAM/CMTS node 112 (and ultimately to the premises gateway node's MVMA functionality). On the other hand, the HTTP pulls and recovery segment delivery in the gateway agent implementation may be effectuated via normal IP router network paths (e.g., bypassing the IGMP functionality since no multicasting is needed) disposed between the FCC HTTP delivery processor 122 and the gateway agent via serving DSLAM/CMTS node 112. By way of illustration, HTTP requests and pulls for 1.2 Mbs recovery segments (reference numeral 215) and 500 Kbs recovery segments (reference numeral 214) corresponding to the two bitrate representations of the particular channel source feed (channel-x) 202 (which are actively being used, i.e., STBs switching to this particular channel at a given bitrate) are shown, which are propagated downstream to the DSLAM/CMTS node 112. An example HTTP pull request may be formatted or otherwise appropriately configured to specify the resource locator/address information (e.g., a uniform resource locator (URL), uniform resource name (URN), or a uniform resource identifier (URI) of a particular recovery segment in the cache 206 at given bitrate) as well as a download delivery rate, R, which may depend on the bandwidth of a channel change pipe, the type of such a pipe, bitrate quality of the target service channel, operator-configured channel change render time constraints, etc., as well as any applicable subscriber-based and/or content-based policies.

It should be appreciated that once the FCC HTTP delivery processor 122 is initiated, it is generally configured to transmit recovery segment data only if there is a specific HTTP pull/download operation pursuant to a channel changing process as facilitated by the MVMA functionality. Further, bandwidth required for implementing FCC in a subscriber premises bandwidth pipe may be provisioned as a dedicated FCC pipe portion or may be taken or borrowed (for a small period of time) from a shared progressive download ABR pipe portion of the subscriber premises bandwidth pipe. Regardless of how the FCC bandwidth is provisioned, recovery segments are delivered via the HTTP download operations, and accordingly, the FCC bandwidth pipe may also be referred to as FCC progressive download pipe, which may be dedicated or shared (with progressive download ABR devices of the subscriber premises) depending on a particular configuration.

In general operation, when a client initializes a channel change event (e.g., request), the requested service channel (also referred to as target service channel) has its segments with header information transmitted via HTTP pull as fast as possible. The gateway also simultaneously tunes to the correct multicast channel, and uses the downloaded recovery segments to access any header information or missing video data from the "true" channel. The gateway then multicasts out the stitched hybrid video (part real, part downloaded recovery segment data), with the end client being not aware of which is which. As noted previously, the hybrid/stitched video stream can either be multicast out at a constant rate, or faster at first (in order to quickly fill the client buffer in STBs with a buffer model that requires a full buffer before playout). Once the HTTP pull is over (or otherwise terminated), typically lasting for a time period less than a second, the extra bandwidth is no longer used. It should be appreciated that policy management can be configured to handle or throttle the bandwidth allocated to the delivery of HTTP pull recovery segments appropriately, e.g., applying weights for the recovery segment downloading and/or weight matching to the targeted new channel. Additionally, policies can make way for the HTTP pulls dropping entire streams or pausing them (e.g., temporarily) for the duration of the recovery segment delivery. Since buffers tend to be smaller than pull time, no noticeable difference may be expected for dropped clients.

One skilled in the art will recognize upon reference hereto that regardless of where an MVMA node is implemented (e.g., the network agent implementation of FIG. 1A or the gateway agent implementation of FIG. 1B), its overall functionality with respect to effectuating channels changes in an example MABR communications environment is broadly the same. Accordingly, various details concerning the foregoing general operations will be described below in an agnostic manner taking reference to the remaining drawing Figures, wherein the description is equally applicable to both network agent and gateway agent implementations, mutatis mutandis.

Figure 3:
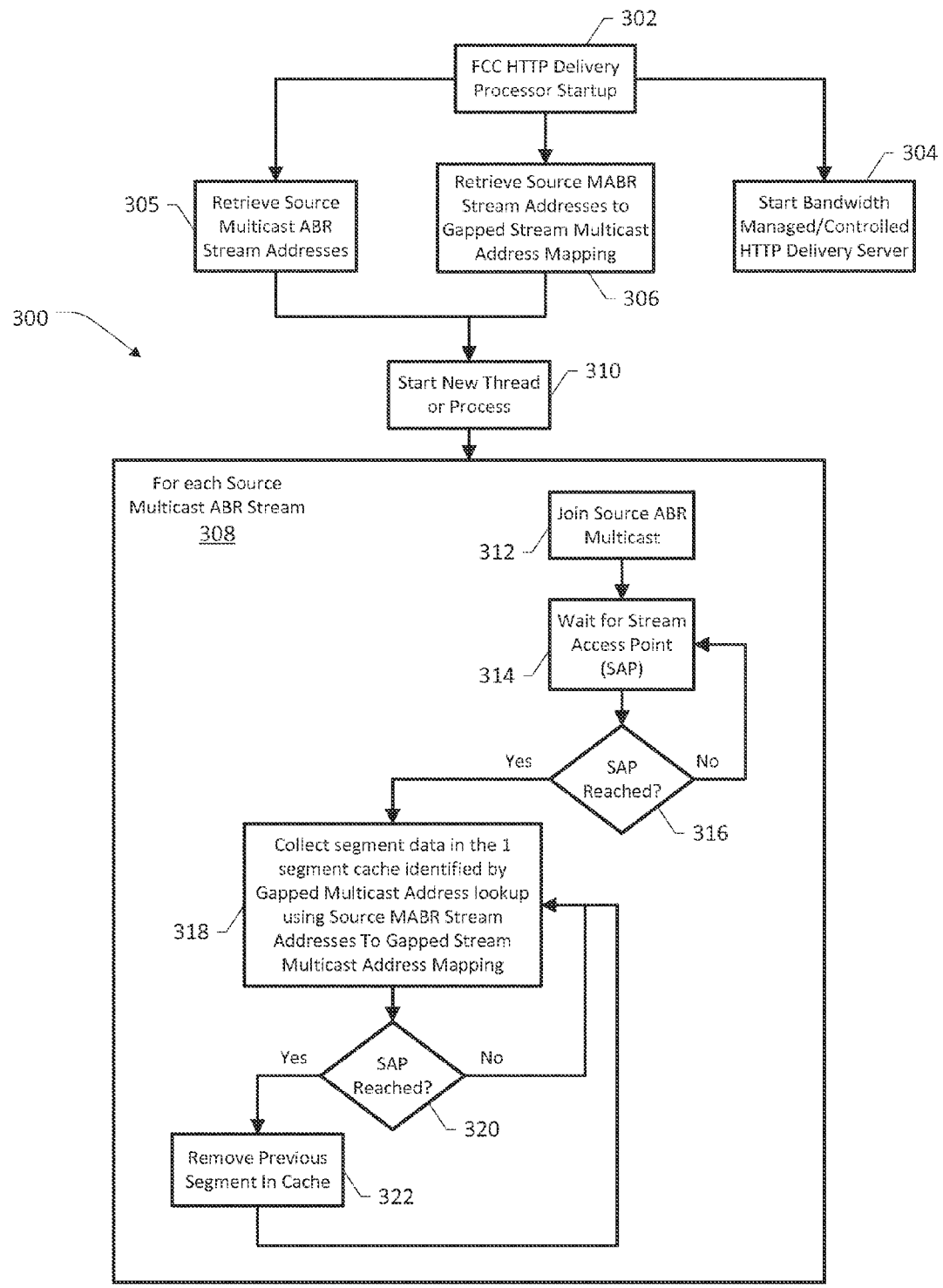
FIG. 3 is a flowchart of various blocks, steps, acts and/or functions that may take place at a channel changing processing element for generating recovery segments corresponding to each bitrate representation of a plurality of service channels provided in an example an MABR communications network arrangement of FIG. 1A or FIG. 1B according to one embodiment.

FIG. 3 depicts a flowchart of various blocks, steps, acts and/or functions that may take place at an FCC HTTP delivery processing element for generating and populating a recovery segment cache having recovery segments for each bitrate representation of a plurality of service channels provided in an example an MABR communications network arrangement of FIG. 1A or FIG. 1B according to an embodiment. In one configuration, process flow 300 represents an example flow of events that may take place as part of FCC HTTP delivery processor startup and initialization. Generally, once a set of requisite input parameters are collected, appropriate service logic executing at the FCC HTTP delivery processor may be configured to create a thread for each source multicast ABR stream. When a stream access point is found in a stream, the segment is added to a cache (e.g., cache 206 in FIG. 2, in case an HTTP pull may be anticipated). When a next stream access point is found, the cached segment is cleared and a new segment is added to the cache instead.

Turning to FIG. 3 in particular, process flow 300 commences with an HTTP delivery process setup 302 that involves retrieval/collection of various pieces of input parametric information, e.g., source multicast ABR stream addresses (block 305) and mapping relationship(s) between source MABR stream addresses and gapped stream multicast addresses (block 306), as well as initiating a delivery server process (block 304), which in one example implementation may be configured to effectuate bandwidth-controlled delivery of recovery segments as noted previously. A separate or new thread may be started or instantiated for each source MABR stream (block 310), wherein an iterative loop 308 with respect to each multicast stream may be executed. In one implementation, iterative loop 308 may commence with joining a source ABR multicast stream (block 312), whereupon the flow waits for SAPs therein (block 314). When a "beginning" SAP is reached (block 316), segment data is collected and stored in a 1-segment cache (block 318), which may be identified, indexed or otherwise tagged by a gapped multicast address lookup, e.g., using the stream address mapping relationship obtained in block 306. This process of collecting segment data is repeated until an "ending" SAP is reached (block 320). Thereafter, a complete cached segment is configured to replace a previously stored segment in the cache (block 322).

Figure 4:
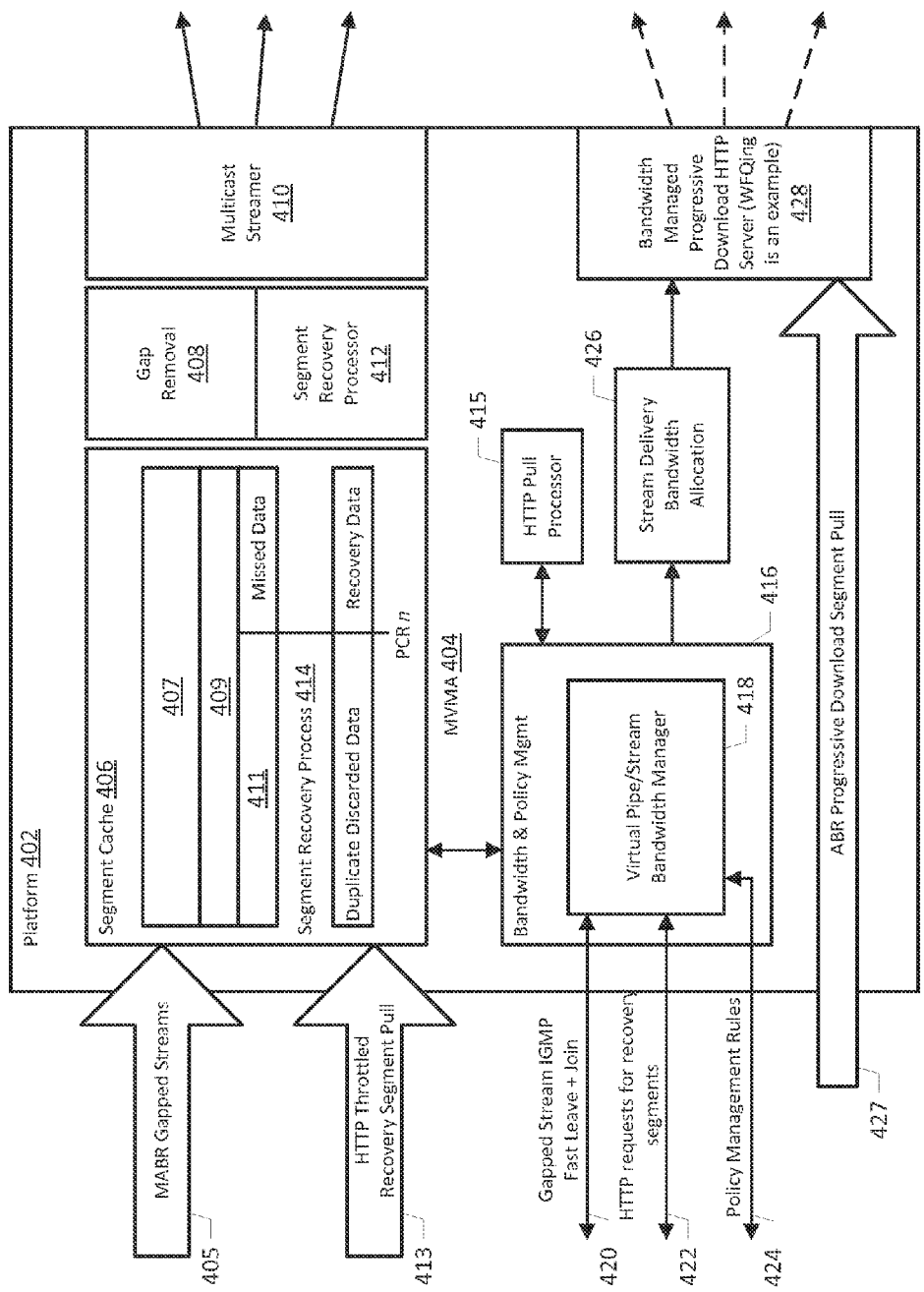
FIG. 4 is a block diagram of a video management agent operative in an example MABR communications network arrangement of FIG. 1A or FIG. 1B according to one embodiment.

FIG. 4 is a block diagram of a node or element 400 operative in an example an MABR communications network arrangement of FIG. 1A or FIG. 1B according to one embodiment, wherein an ABR video management agent or functionality 404 may be realized as a virtual function or machine on a host hardware/software platform 402, e.g., in a network agent implementation or in a premises gateway agent implementation. As described previously, a plurality of MABR gapped/segmented streams 405 comprising various bitrate representations of multicast service channels are received by node 402 at corresponding multicast IP addresses, which may be changing on the fly depending on the IGMP Join/Leave operations. Also, demand-driven HTTP-throttled recovery segment pull data 413 is received by the node 402 from the FCC HTTP delivery processor node at appropriate network addresses/ports configured to effectuate HTTP download operations. Whereas node 402 is also operative to receive ABR progressive download pull content 427, it should be appreciated that it is not a requirement in an example dedicated FCC pipe implementation. Where provided, a progressive download HTTP server 428 is operative to facilitate downloading of ABR content via suitably managed pipes to respective ABR clients (e.g., nontraditional OTT STBs, connected TVs, tablets, etc., not shown) in response to bandwidth allocation inputs 426 provided by a virtual pipe or stream bandwidth manager 418 that may be part of an overall bandwidth and policy management module 416 operative to manage a subscriber premises bandwidth pipe. It should be appreciated that various bandwidth weights, factors, priorities, etc. may be used for managing the bandwidth of the progressive download pipes according to any known or heretofore unknown techniques such as weighed fair queuing (WFQ) or other bandwidth management techniques. Additional details regarding example bandwidth management, scheduling and/or allocation schemes that may be utilized in conjunction with embodiments set forth in the present patent disclosure may be found in one or more of following commonly owned U.S. patent(s) and/or U.S. patent application publication(s): (i) "BANDWITH MANAGEMENT FOR OVER-THE-TOP ADAPTIVE STREAMING" (Ericsson Ref. No.: P39592-US1), application Ser. No. 13/845,320, filed Mar. 18, 2013, in the name(s) of Charles Dasher et al., published as U.S. Patent Application Publ. No. 2014/0280764; (ii) "REGULATING CONTENT STREAMS FROM A WEIGHTED FAIR QUEUING SCHEDULER USING WEIGHTS DEFINED FOR USER EQUIPMENT NODES" (Ericsson Ref. No.: P37772-US1), application Ser. No. 13/597,333, filed Aug. 29, 2012, in the name(s) of Charles Dasher et al., published as U.S. Patent Application Publ. No. 2014/0068076; (iii) "METHODS AND APPARATUS FOR MANAGING NETWORK RESOURCES USED BY MULTIMEDIA STREAMS IN A VIRTUAL PIPE" (Ericsson Ref. No.: P36357-US1), application Ser. No. 13/403,075, filed Feb. 23, 2012, in the name(s) of Bob Forsman et al., now issued as U.S. Pat. No. 8,549,570; and (iv) "METHODS, APPARATUS, AND COMPUTER PROGRAM PRODUCTS FOR ALLOCATING BANDWIDTH FOR PUSH AND PULL CONTENT REQUESTS IN A CONTENT DELIVERY NETWORK" (Ericsson Ref. No.: P39663-US1), application Ser. No. 13/856,895, filed Apr. 4, 2013, in the name(s) of Christopher Phillips et al., published as U.S. Patent Application Publ. No. 2014/0304372, each of the foregoing patent(s) and/or publication(s) being incorporated by reference herein.

A segment cache 406 is provided wherein a plurality of segments corresponding to one or more active multicast service channels having potentially different bitrate qualities, e.g., as referenced by reference numerals 407, 409, may be stored. A segment recovery process 414 is illustratively shown in operation with the segment cache 406 for an actively changing channel (i.e., the target service channel to which an STB is changing), e.g., channel 411, wherein a portion of the service channel stream data may be missing, unusable or otherwise unavailable, potentially because of the latency involved in the channel changing process. In accordance with the teachings herein, the segment recovery process 414 is configured to patch or stitch the missing data using downloaded recovery segment data at an appropriate timing reference under a suitable processing entity 412, and send out the patched segment stream to the requesting STB. Typically, there may be no indication to the STB as to which part of the segment is recovered from the FCC recovery segment and which part of the segment is the actual (i.e., "true") multicast service channel data. It is important to note, however, that the initial part (e.g., containing header information) of the recovery segment is properly combined with the corresponding multicast channel data such that suitable reference information necessary for rendering the channel data is provided to the STB as soon as possible. One skilled in the art will recognize that in an extremely rare scenario where the channel changing time is such that the regular multicast stream is complete, no stitching from a recovery segment stream may be required.

A gap removal module 408 is operative in conjunction with the segment recovery processor 412 and a multicast streamer 410 to de-dap the gapped segments of a multicast service channel stream (including recovered segment data where needed), and remux and multicast the service channel stream towards the premises gateway and ultimately to the STB devices disposed therein on ports having suitably fixed multicast IP addresses that the receiving entities are aware of. The virtual pipe and stream bandwidth manager 418 is also operative to effectuate channel/stream joining and leaving operations with respect to suitable bitrate representations of gapped service channel streams under IGMP Join and Leave operations 420 as well as formatting or otherwise providing applicable recovery segment addressing data (e.g., address/port information) for configuring HTTP requests 422 with the correct addresses, which may be modulated based on policy management rules 424. In the case of a dedicated FCC pipe implementation, it is generally preferable that all of the provisioned bandwidth for channel changes is used in order to optimize the bitrate quality of the stream to be joined. On the other hand, in a shared progressive ABR download pipe implementation, it may be preferable to "borrow" just enough bandwidth (so as not to adversely affect any ongoing ABR download sessions in a significantly deleterious manner) to handle the channel change operations appropriately (e.g., within the operator-configured channel render times, QoS policies, etc.) and release it back to the shared progressive ABR download pipe. An HTTP pull processor 415 may be operative in conjunction with the bandwidth and policy management 416 to initiate appropriately formatted HTTP requests directed to a suitable cache for downloading recovery segments that meet applicable QoS requirements within the various constraints identified herein. Furthermore, since the delivery of recovery segments is effectuated via progressive download operations of HTTP, suitable bandwidth throttling mechanisms such as those referenced and incorporated hereinabove may be applied here as well in certain example implementations.

Overall service logic executing as part of the MVMA functionality of node 402 may therefore be configured to stitch the service channel to which a requesting STB has changed and the corresponding recovery segment at a matching bitrate representation that not only satisfies the CC render time constraints but also meets QoS requirements in an optimal manner. For example, if the target service channel to which the STB is changing is at a higher bitrate quality than can be accommodated in either a dedicated FCC pipe (DFP) or a shared FCC pipe (SFP) implementation, then according to an optimization scheme of the present invention, a lower bitrate quality representation of the service channel and the corresponding recovery segment may be initially stitched. Thereafter, the bitrate quality of the joined target service channel may be ramped up in an incremental manner in a further bandwidth (re)allocation process, i.e., bandwidth annealing, applied to the streaming video pipe portion of the subscriber premises bandwidth pipe so that the target service channel reaches its intended/provisioned QoS. In one implementation, the joined service channel may be burst-transmitted all the way towards the STB so as to fill its buffer as quickly as possible to minimize channel rendition latency. Typically, the STB waits for a special type of an I-frame (e.g., Instantaneous Decoder Refresh or IDR frame in H.264) to be received prior to decoding the received data. When the MVMA functionality performs an HTTP download operation, it immediately begins to transmit the recovery segment data to the gateway or STB without having to wait for an IDR in the data. Accordingly, it should be appreciated that having the recovery segment provide the necessary header information as quickly as possible at a correct bitrate in accordance with the teachings herein advantageously allows a bandwidth-optimized channel changing process in a multicast communications network.

Figure 5:
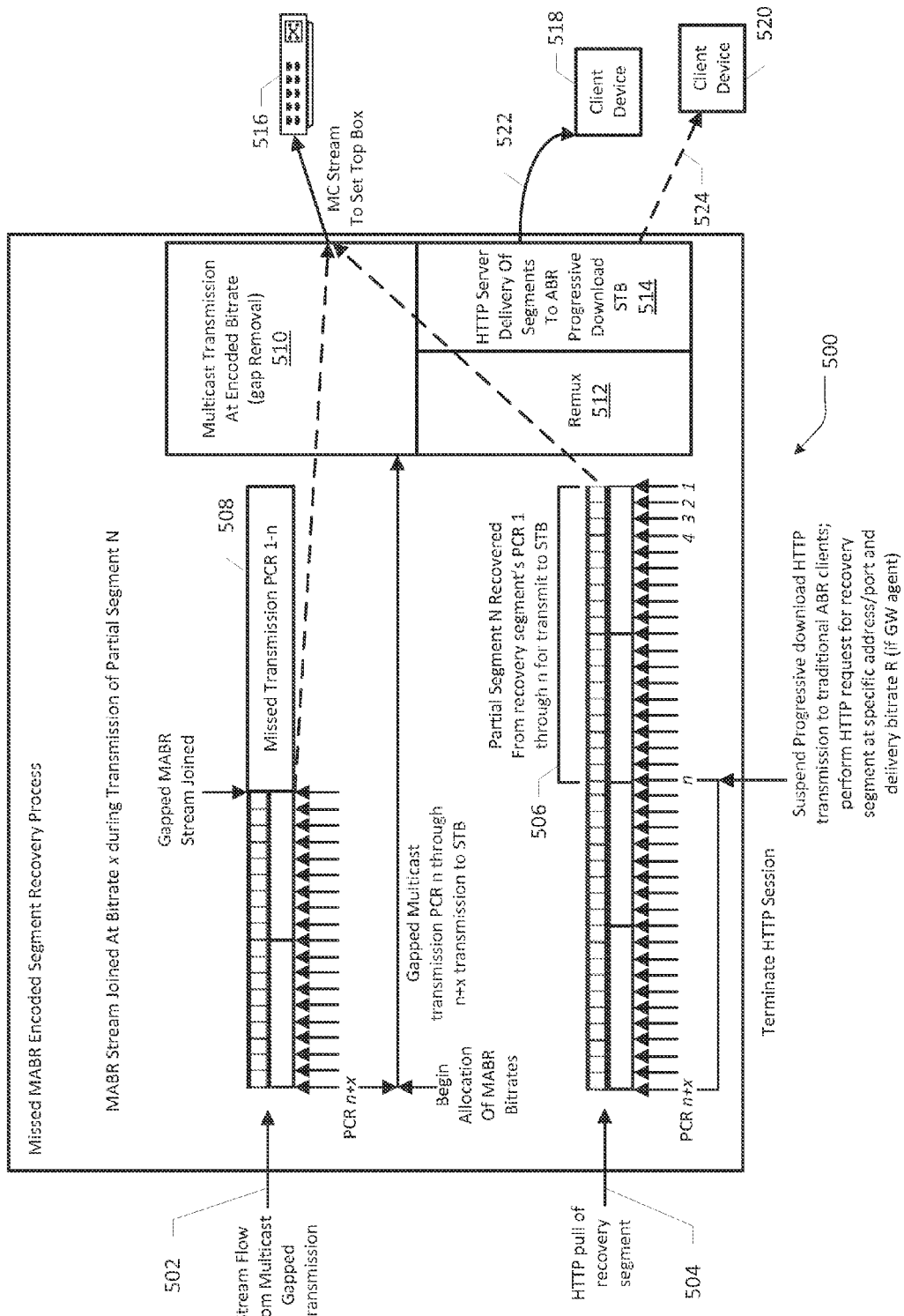
FIG. 5 is a block diagram showing additional details of a segment recovery process engaged by the ABR video management agent for stitching, i.e., joining, a recovery segment obtained via HTTP pull and a particular MABR stream of target service channel requested by a subscriber station, e.g., STB, in response to a channel change request.

FIG. 5 is a block diagram showing additional details of a segment recovery process 500 in a pictorial representation engaged by an MVMA functionality for stitching a downloaded recovery segment's data with a particular MABR stream of target service channel requested by a subscriber station, e.g., STB 516, in response to a channel change request. As described previously, the segment recovery process 500 is effectuated in conjunction with gap removal 510 and a remux process 512. Where the media content of a service channel is also provided to other client devices, e.g., progressive download devices 518, 520, appropriate mechanisms 522, 524 may be effectuated by an HTTP server 514. When a channel change is initiated, both the target service channel's multicast stream 502 and corresponding HTTP-pulled recovery segment stream 504 may be joined. The regular service channel segment 502 is analyzed and a first time code reference (e.g., a PCR in an MPEG-TS stream) is noted. The recovery segment data stream 504 is also analyzed and packets with PCR earlier than the PCR from the regular service channel segment are saved. The saved recovery packets are added ahead of the regular multicast service channel's packets, preferably ordered by PCR time codes, resulting in a partial segment 506. Service channel data packets having PCR 1 to n form a missed portion 508 of the channel data, which are recovered and stitched from the partial segment 506 for transmission to the STB 516. At a suitable PCR common to both the recovery segment data stream 504 and the regular service channel segment 502, the HTTP download operation is terminated or otherwise rendered inactive, and the regular service channel segment is joined via an IGMP Join operation. While the entire recovery segment may be transmitted across instead of stitching, it should be appreciated that stitching allows a segment to be sent faster, e.g., no need to wait for the recovery to complete in order to have the whole segment. Further, stitching operations free up borrowed bandwidth faster in the case of borrowing from a shared progressive download pipe. It should be appreciated that although PCR time codes have been exemplified herein, other time codes such as presentation timestamps (PTS), decoding timestamps (DTS), and system clock references (SCR) and the like, may also be utilized in additional or alternative embodiments within the scope of the teachings herein.

As noted in FIG. 5, an HTTP request for the recovery segment at a specific address/port may also include a delivery rate that may be appropriate for a gateway agent implementation due to the access network's bandwidth constraints. Further, there may be suspension/reduction on bitrates with respect to progressive download ABR sessions where such devices are provided and depending on how the FCC bandwidth pipe is configured (i.e., shared vs. dedicated). Regarding the inactivation or suspension of the HTTP downloading of a recovery segment stream, several options may be implemented. For instance, an HTTP download request (e.g., the URL) may be configured to specify a PCR for cutoff (e.g., first PCR in the buffer after the multicast service stream has joined). In another variation, the ABR video management agent executing the segment recovery process 500 may be configured to terminate the HTTP download operation by closing a socket used for receiving the recovery segment immediately after a matching time code reference point has been identified. In a still further variation, the ABR video management agent may be configured to issue an out-of-band signaling message adapted to specify a source port, a destination port and the PCR in the recovery segment (e.g., the first PCR value received after the multicast service stream has joined) at which the HTTP download operation is to be terminated.

Figure 9:
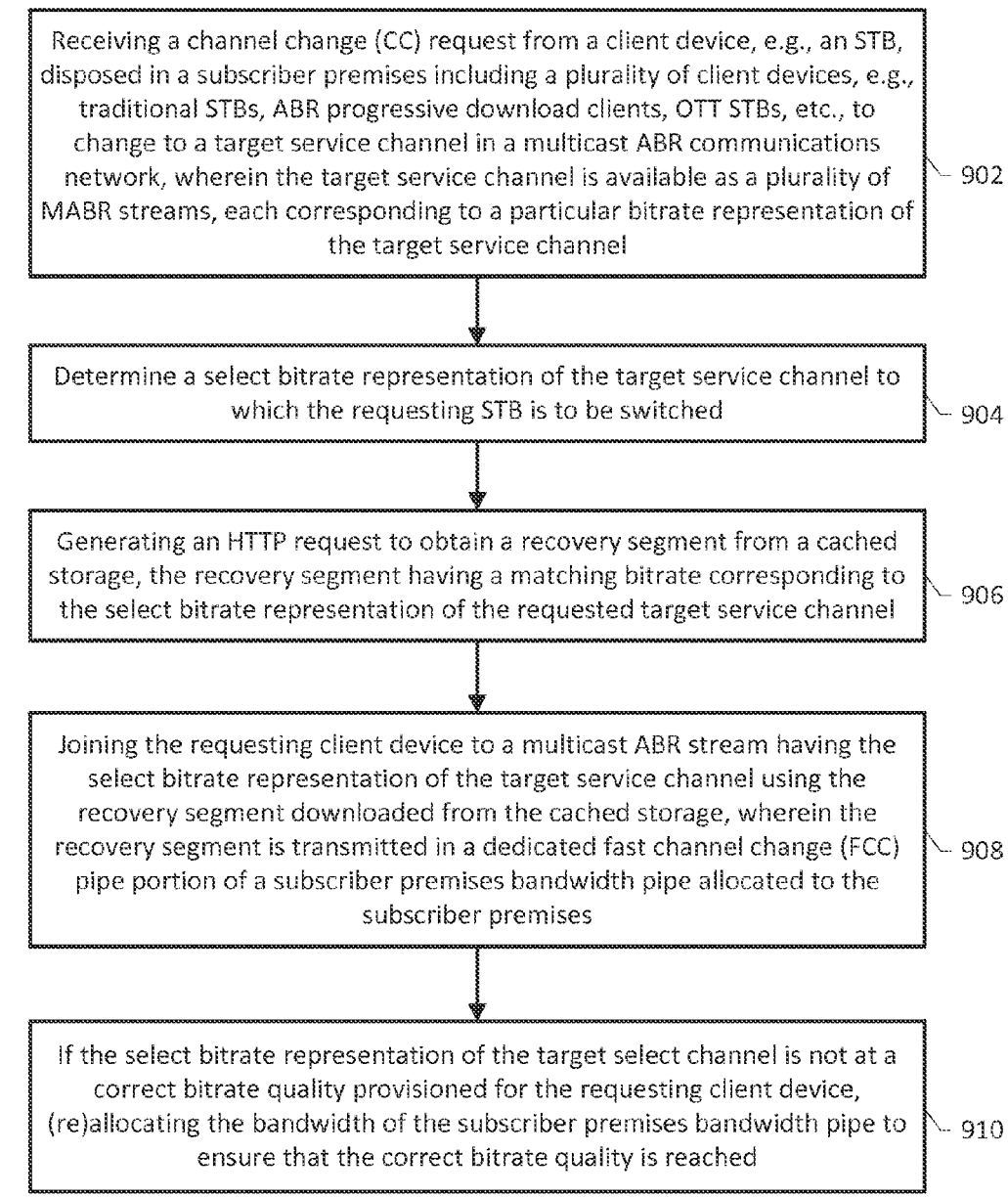
FIG. 9 is a flowchart of an example channel changing process according to an embodiment of the present patent application.

Turning to FIG. 9, shown therein is a flowchart of an example channel changing process 900 according to an embodiment of an MVMA functionality of the present patent application. At block 902, a channel change (CC) request is received from a client device, e.g., an STB, disposed in a subscriber premises including a plurality of client devices, e.g., traditional STBs, ABR progressive download clients, OTT STBs, etc., to change to a target service channel in a multicast ABR communications network, wherein the target service channel is available as a plurality of MABR streams, each corresponding to a particular bitrate representation of the target service channel. At block 904, a determination may be made as to identifying, calculating, or otherwise obtaining, a select bitrate representation of the target service channel to which the requesting STB is to be joined or switched. An HTTP request is generated that is formatted or otherwise configured to obtain a recovery segment from a cached storage, wherein the recovery segment has a matching bitrate corresponding to the select bitrate representation of the requested target service channel (block 906). In addition to specifying the requisite address/port information, an HTTP URL request may be provided with extra pieces of information as noted previously. The requesting STB device is joined to a multicast ABR stream having the select bitrate representation of the target service channel using the recovery segment downloaded from the cached storage, wherein the recovery segment is transmitted to the STB device in a dedicated fast channel change (FCC) pipe portion of a subscriber premises bandwidth pipe allocated to the subscriber premises (block 908). If the select bitrate representation of the target select channel is not at a correct bitrate quality provisioned for the requesting client device, a(n) (re)allocation process may take place with respect to the subscriber premises bandwidth pipe to ensure that the correct bitrate quality is reached (block 910).

Figure 10:
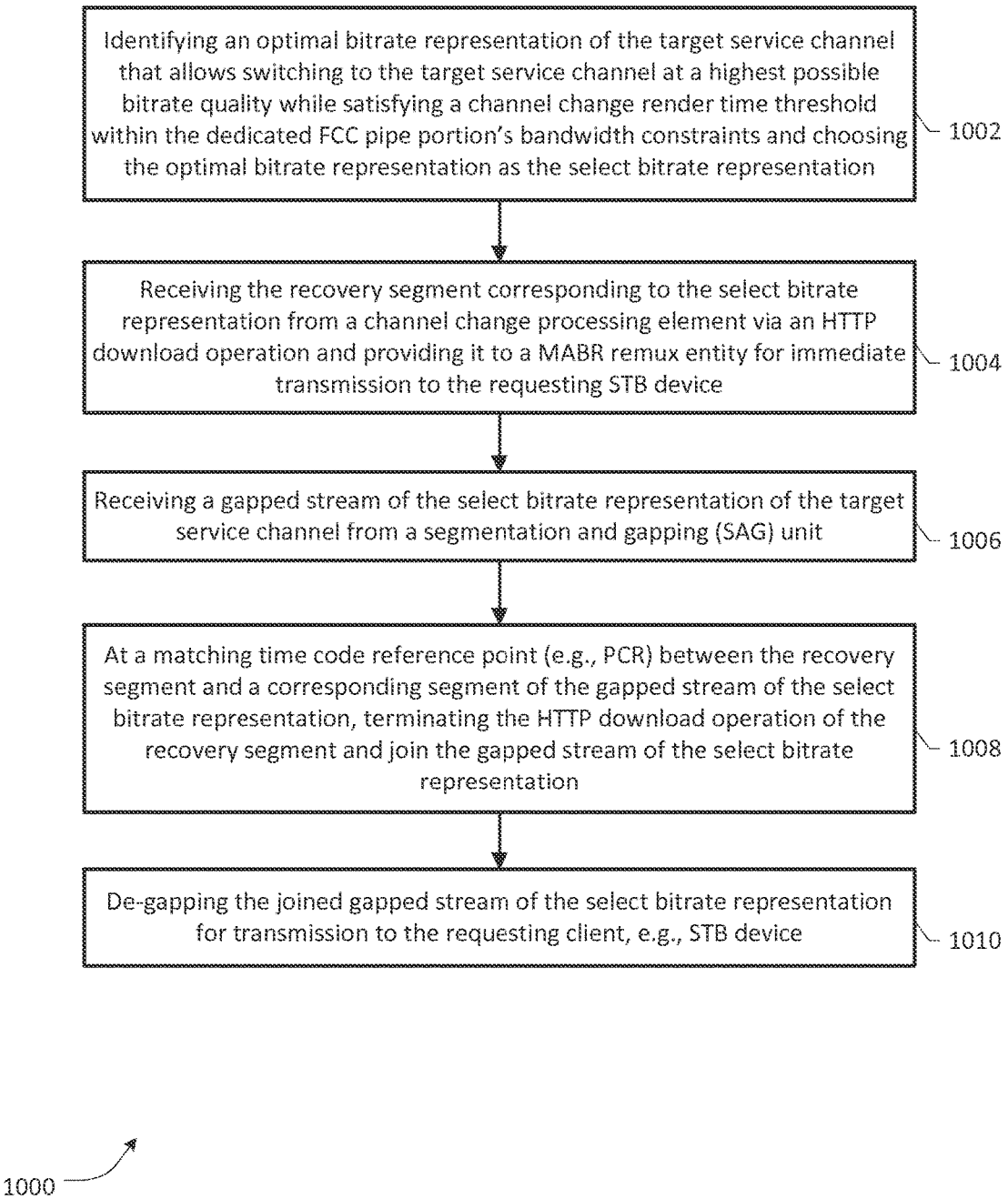
FIG. 10 is a flowchart of a process with additional details relative to an example channel changing process according to an embodiment of the present patent application.

FIG. 10 is a flowchart of a process with additional details relative to channel stitching in an example channel changing process, e.g., process 900 set forth above, according to an embodiment of the present patent application. At block 1002, an optimal bitrate representation of the target service channel is identified such that its corresponding recovery segment allows switching to the target service channel at a highest possible bitrate quality while satisfying a channel change render time threshold (i.e., low latency) within the dedicated FCC pipe portion's bandwidth constraints. The identified optimal bitrate representation may be chosen as the select bitrate representation of the target service channel at which the channel changing may take place. At block 1004, the recovery segment data corresponding to the select bitrate representation is received (via HTTP pull from a channel change processing element in a download operation), which is provided to a MABR remux entity for immediate transmission to the requesting STB device. A gapped stream of the select bitrate representation of the target service channel (received from a segmentation and gapping (SAG) unit) is analyzed. At a matching time code reference point (e.g., PCR) between the recovery segment data and the corresponding segment of the gapped stream of the select bitrate representation, the HTTP download operation is terminated and the gapped stream of the select bitrate representation is joined by way of suitable IGMP operations (blocks 1006, 1008). The joined gapped stream of the select bitrate representation is then de-gapped for transmission to the requesting client, e.g., STB device (block 1010).

Figure 6:
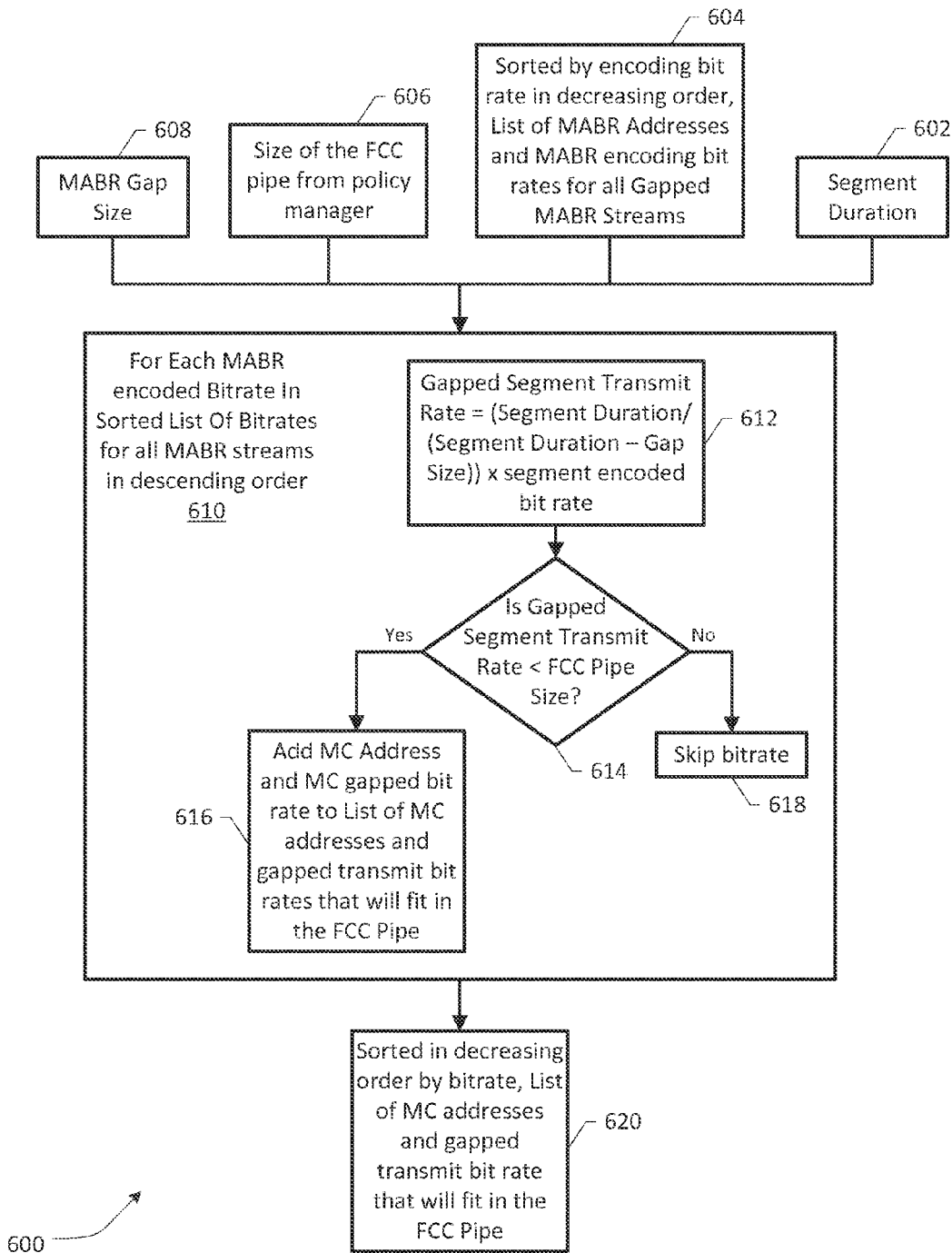
FIG. 6 depicts a flowchart of an example process for identifying optimal bitrates for recovery segments joining via a dedicated fast channel change (FCC) pipe according to one embodiment.

Additional features, variations, and/or modifications with respect to the foregoing processes will now be described hereinbelow by taking reference to the remaining drawing Figures as examples of specific implementations. FIG. 6 depicts a flowchart of an example process 600 for identifying optimal bitrates for MABR streams and recovery segments downloaded via a dedicated fast channel change pipe according to one embodiment. A bitrate identification process 600, which may take place at a suitable MVMA functionality, is therefore broadly operative as to how a list of MABR service channel streams having optimal bitrates may be generated. Only qualifying streams from this list may be allowed to join the flow in a dedicated FCC pipe for a group of multicast receivers. Similar to the inputs provided to an FCC HTTP delivery processing functionality (e.g., set forth in FIG. 3), a policy manager may be configured to provide the ABR segment size or duration (block 602), size of the FCC pipe (block 606) and the size or duration of MABR gap (block 608) while an MABR encoder is operative to provide a sorted list of bitrates (and corresponding addresses) for all gapped MABR streams in descending order (block 604). In one example implementation, given MABR gap size data, the FCC pipe size, the various bitrates and the segment duration, the bitrate identification process is operative to filter out all bitrates not compatible with the FCC pipe. An iterative loop process 610 may be executed for each bitrate in the sorted list of bitrates for all MABR streams in descending order, commencing with a determination of a gapped segment transmit rate (e.g., in bits per second), which may be obtained as (segment duration/(segment duration−gap size))×segment encoded bitrate, as set forth at block 612. A further determination is made whether the calculated gapped segment transmit rate is less than or equal to the FCC pipe size (block 614). If so, the multicast address and stream bitrate are added to a list of MABR stream bitrates whose recovery segments will fit in the FCC pipe (block 616). Otherwise, that bitrate is skipped (block 618). A list of MABR optimal bitrates that fit in the constraints of the FCC pipe may be generated, including the associated multicast addresses (block 620), which may be sorted in descending order with respect to the bitrates in one example implementation.

Figure 7:
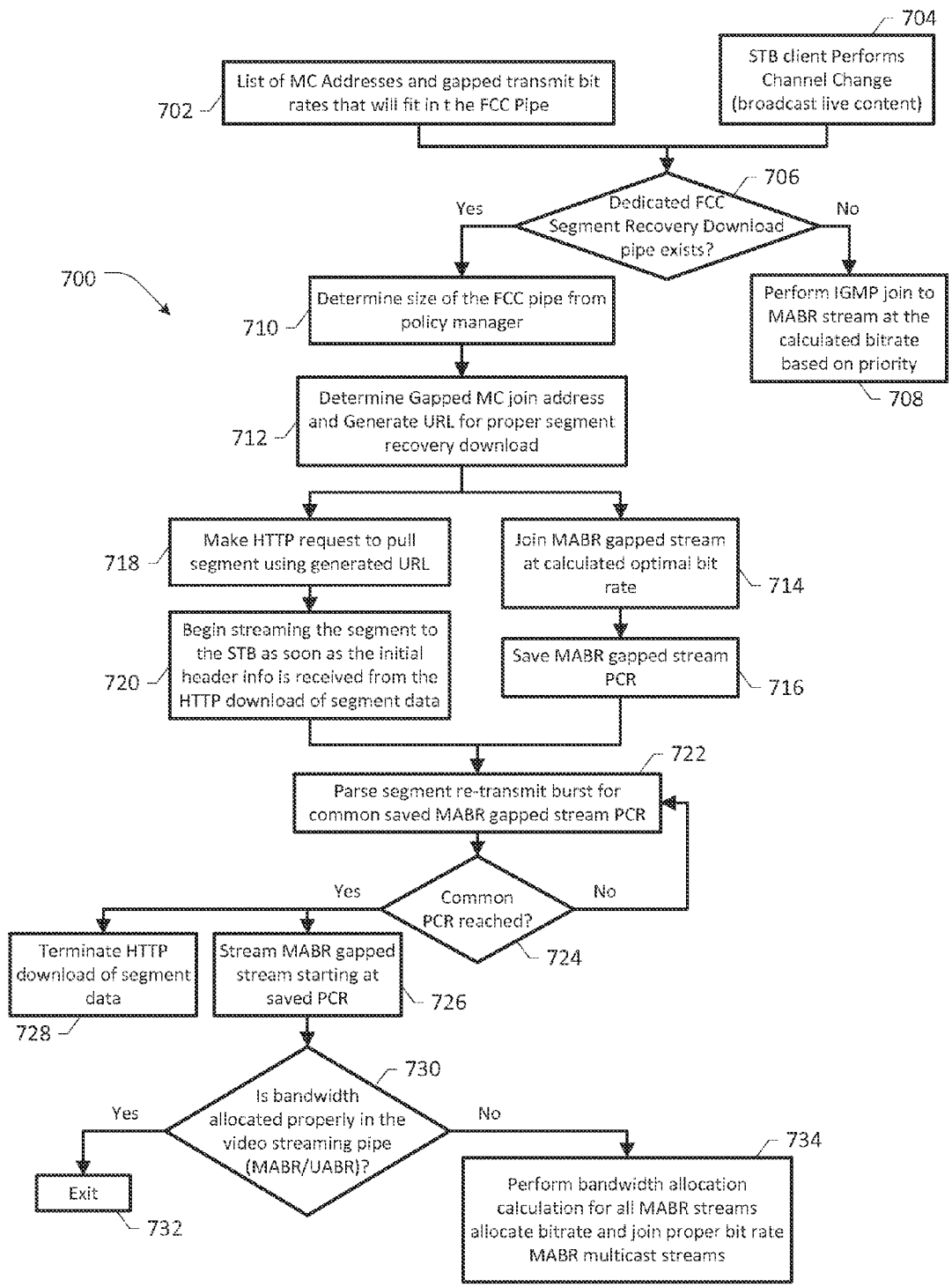
FIG. 7 is a flowchart of an example channel changing process with additional details according to an embodiment.
Figure 8:
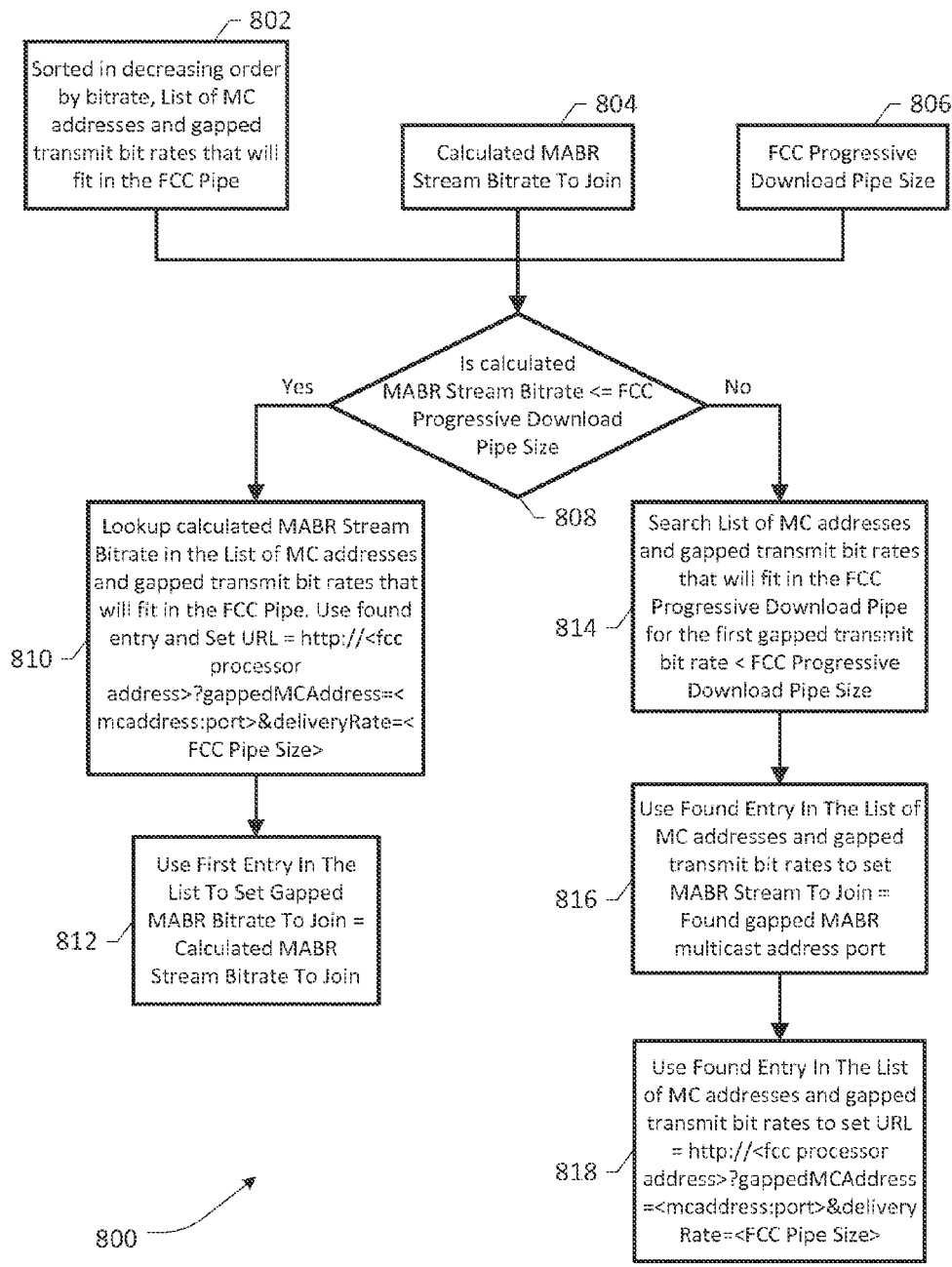
FIG. 8 is a flowchart of an example process for identifying common bitrates of MABR streams of a target service channel and corresponding recovery segments for joining according to an embodiment of the present patent application.

FIG. 7 is a flowchart of an example channel changing process 700 with additional details according to an embodiment, wherein a list of MABR optimal bitrates obtained in the foregoing process may be utilized as an input (block 702). In one implementation, when a channel change is requested by an STB (block 704), a separate process for obtaining common bitrates between recovery segments and the MABR gapped/segmented service channel streams may be provided, taking into consideration the available HTTP download bandwidth, which is shown in FIG. 8. Thereafter, both the recovery segment as well as the gapped MABR stream are joined and analyzed. By parsing the data packets of the streams, common PCR codes or other relevant time code references may be obtained, although video from the recovery segment stream, e.g., stream 504 in FIG. 5, is initially displayed to the client STB. Once the common PCR is found, HTTP pull operation for recovery segment data is terminated whereas the MABR gapped/segmented service channel stream's join operation continues. Finally, the dedicated FCC pipe's bandwidth consumed in the channel changing process is released back (i.e., available for subsequent CC operations, if any). As noted previously, termination of HTTP download operations responsive to identifying common time code reference points may be performed in multiple ways. In another variation, a determination may be made initially as to whether there exists a dedicated FCC recovery segment download pipe (block 706). If not, normal IGMP operations may be effectuated to join the requested MABR target service channel at a calculated bitrate based on priority (block 708). If it is determined that a dedicated FCC recovery segment download pipe exists (as set forth in block 706), its bandwidth size or capacity may be obtained from a policy manager (block 710). Common bitrates between the MABR gapped/segmented service channel streams and corresponding recovery segments may be calculated, along with generating appropriate URLs for effectuating downloads of proper recovery segments (block 712, which may be implemented as a process 800 described below). At block 718, an HTTP request is made to the segment cache to pull the correct recovery segment using the generated URL, which is then streamed as soon as the initial header information is obtained or received from the downloaded segment (block 720). Substantially in parallel, the target service channel's MABR gapped/segmented stream is also joined at the calculated optimal bitrate (block 714), whereupon the first PCR of the stream is identified and saved (block 716). The recovery segment's data is parsed to identify a PCR that matches the saved PCR value of the target service channel's MABR gapped/segmented bitrate representation (block 722), which may be iterated until a common PCR is found (block 724). Thereafter, the target service channel's MABR gapped/segmented bitrate representation is streamed from the saved PCR (block 726) while the HTTP download operation may be terminated (block 728). A determination may be made as to whether the bandwidth of the video streaming pipe of the subscriber premises bandwidth pipe remains properly allocated, which may include multiple MABR client devices as well as unicast ABR devices (block 730). Further, such a determination may include a determination of whether the target service channel to which the requesting STB has switched is at a proper bitrate and whether it should or could be ramped up, as noted previously. If the various conditionalities of the decision block 730 are satisfied, the process flow may terminate (block 732); otherwise, suitable bandwidth allocation processes may be effectuated, e.g., by the bandwidth and policy management module 416 associated with the MVMA agent 404 (shown in FIG. 4). Accordingly, it should be appreciated that where the bitrates of one or more streaming channels of the subscriber video pipe are adjusted in a post-CC scenario, additional IGMP Join/Leave operations may take place to ensure that all active channels are at respective proper bitrate representations.

It should be noted that at least some of the bandwidth allocation and/or reallocation operations as well as channel joining operations set forth above make take place using a number of "channel packing" techniques that may involve pipe modeling schemes based on various pieces of parametric information such as composite device priorities (CDP), inadequacy metrics (IM), and the like, potentially/preferably in conjunction with operator-, subscriber-, and/or content-based policy rules. In general, for example, a new channel may be added to the streaming bandwidth pipe based on inadequacy metrics used for selecting which streams are eligible for a bandwidth upgrade during annealing (i.e., iteratively changing bandwidth until no further optimal reallocation can be made). Basically, the inadequacy metric (IM) may be considered as a measure of how far out of balance an allocation to a stream is with regard to its priority and the priority of the other streams in a bandwidth pipe. In one example methodology, given a list of channels and the ABR bandwidths available for each channel, the channels are first sorted by their priority (or other parameters relating to channel weight). A select minimum bandwidth version of the channel is added to the pipe plan. If the channel's minimum bandwidth does not fit (i.e., the pipe is overbooked), then it does not go in the pipe plan and the process moves on to the next channel for further iterations to see how much of an upgrade can be made to the pipe plan. As the channels in the list are sorted by the inadequacy metric, the process can start with the most inadequate channel allocation for attempting to upgrade the bandwidth to the next highest available version of a channel. As pointed above, if the upgrade does not fit within the pipe, that upgrade is skipped and the scheme proceeds to the next most inadequate channel. One skilled in the art should realize that a further variation in optimization may be where channels whose upgrade is impossible, they can be removed from consideration for the rest of the annealing loop. Once a channel is selected for upgrade, the inadequacy metric is recomputed and the scheme restarts the annealing loop, which may be configured to end when no channels can be upgraded to fit into the bandwidth allocation of the bandwidth pipe. Likewise, a CDP-based channel packing may be employed in an annealing process involving MABR and/or UBAR video streams of the streaming video pipe serving a subscriber premises. Additional details with respect to bandwidth divider implementations (e.g., dividing the total streaming video pipe into a MABR portion and a UABR portion), as well as metrics-based stream management may be found in one or more of the following commonly owned U.S. patent application(s): (i) "UNICAST ABR STREAMING" (Ericsson Ref. No.: P43082-US1), application Ser. No. 14/246,920, filed Apr. 2, 2014, in the name(s) of Christopher Phillips et al., and (ii) MERGING MULTICAST ABR AND UNICAST ABR WITH PROGRESSIVE DOWNLOAD ABR IN A CUSTOMER PREMISES DEVICE WITHIN THE SAME VIDEO DELIVERY PIPE" (Ericsson Ref. No.: P43011-US1), application Ser. No. 14/246,880, filed Apr. 2, 2014, in the name(s) of Christopher Phillips et al., which are hereby incorporated by reference.

Taking reference to FIG. 8, shown therein is a flowchart of an example process 800 for identifying common bitrates of MABR streams of a target service channel and corresponding recovery segments for joining according to an embodiment of the present patent application. Basically, if the first bitrate in the list of addresses and bitrates identified above is less than a calculated MABR stream bitrate to join, then the bitrate of gapped MABR stream to join and the corresponding recovery segment's bitrate are set to the calculated MABR steam bitrate. Otherwise, they are set to the first bitrate in the list. In either process, the URLs for HTTP pulls may be programmatically determined based on a table query or lookup. In further detail, at block 802, a list of the MABR optimal bitrates and corresponding multicast addresses that will fit in the FCC pipe are provided, which may be determined or obtained as set forth in blocks 620 or 702 described above. At block 804, calculated bitrates of MABR gapped/segmented streams are provided, which may be determined by way of channel packing/modeling techniques used in bandwidth management. An FCC pipe size for supporting the recovery segment downloading is also provided as part of the input (block 806). If the calculated bitrate to join is less than or equal to the FCC pipe size, that calculated bitrate is looked up in the list of multicast addresses (e.g., a table or database query) and the corresponding address is used in constructing an HTTP URL request that includes the relevant pieces of information (blocks 808 and 810). The first entry of the list may be used to set the gapped MABR stream bitrate to join at the calculated MABR stream bitrate (block 812). On the other hand, if the calculated MABR stream bitrate to join is not less than the FCC pipe size, the list of MABR optimal bitrates and multicast addresses (obtained in block 802) is searched to identify the first gapped MABR stream bitrate that is less than the FCC pipe, as set forth in block 814. Thereafter, the identified entry in the list is used to set the MABR stream to join (block 816). Also, the identified entry in the list is used for obtaining the corresponding address information in order to construct suitable HTTP URLs (block 818). As noted previously, the URLs may be modified and/or extended to include PCR values to stop delivering recovery segment data (e.g., because that is the PCR from the joined gapped MABR bitrate stream), depending on the selected termination methodology.

Figure 11A:
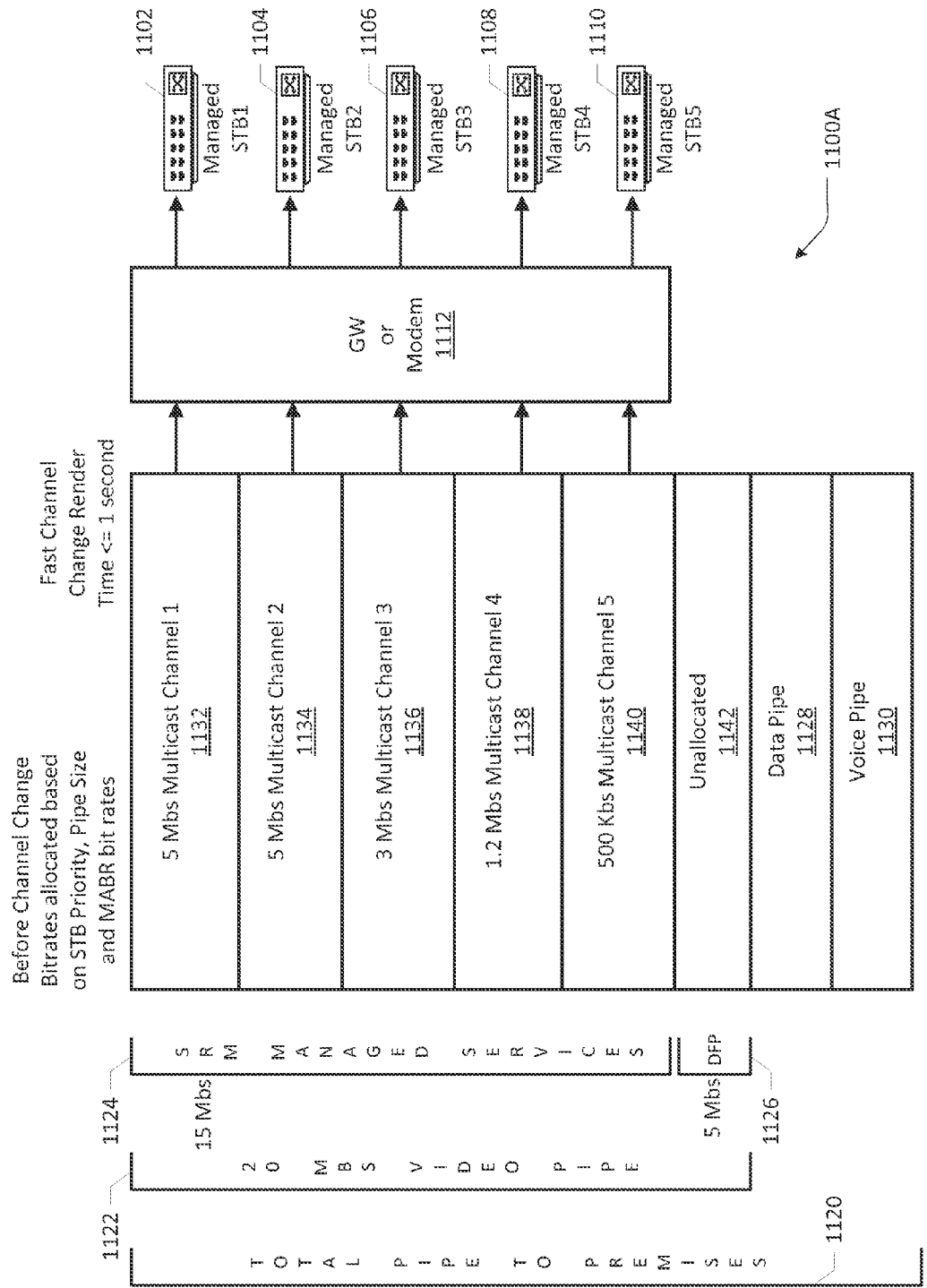
FIGS. 11A-11C depict bandwidth allocation of a streaming bandwidth pipe in one example scenario in response to a channel change request from a subscriber station.
Figure 11B:
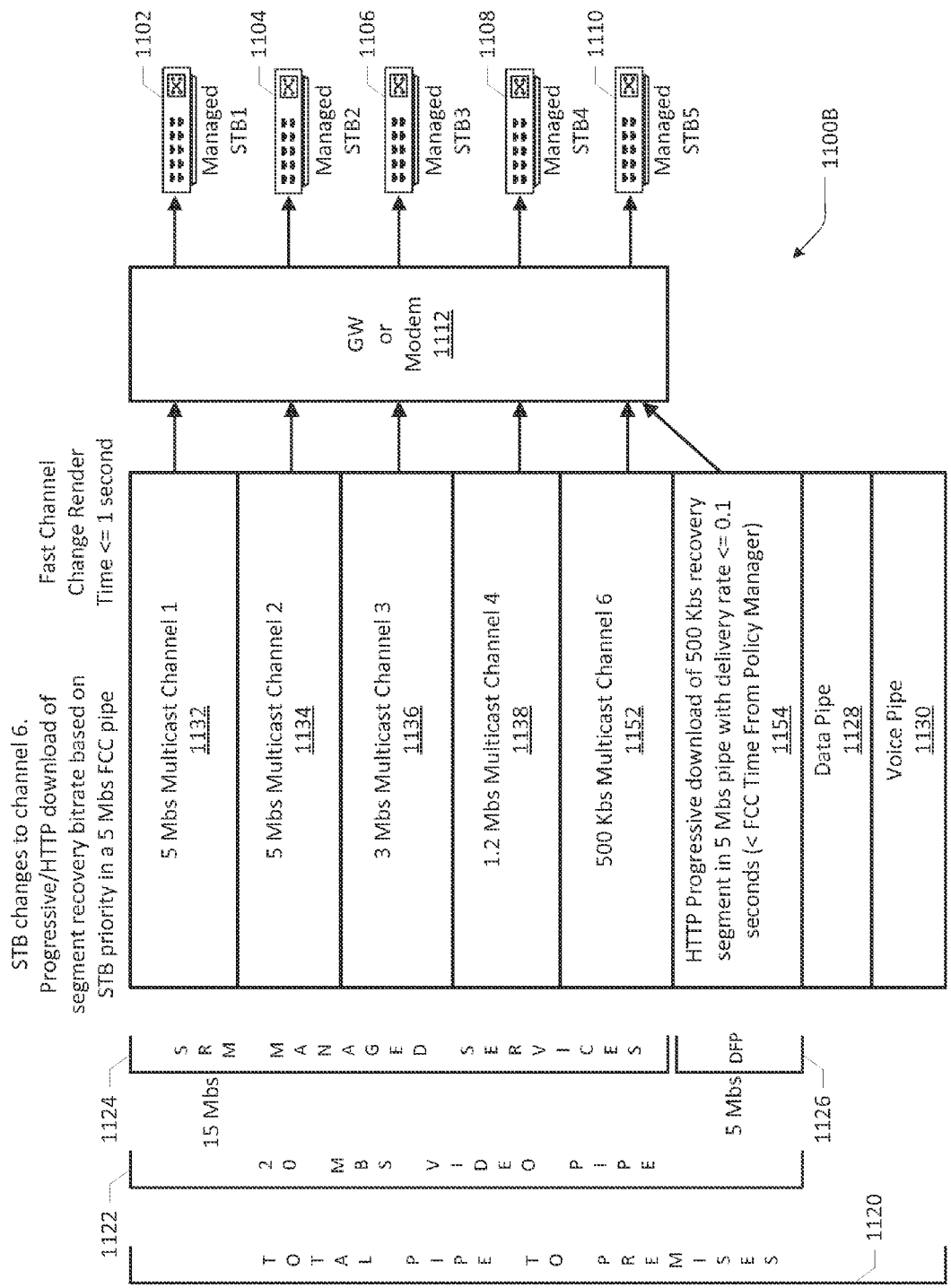
Figure 11C:
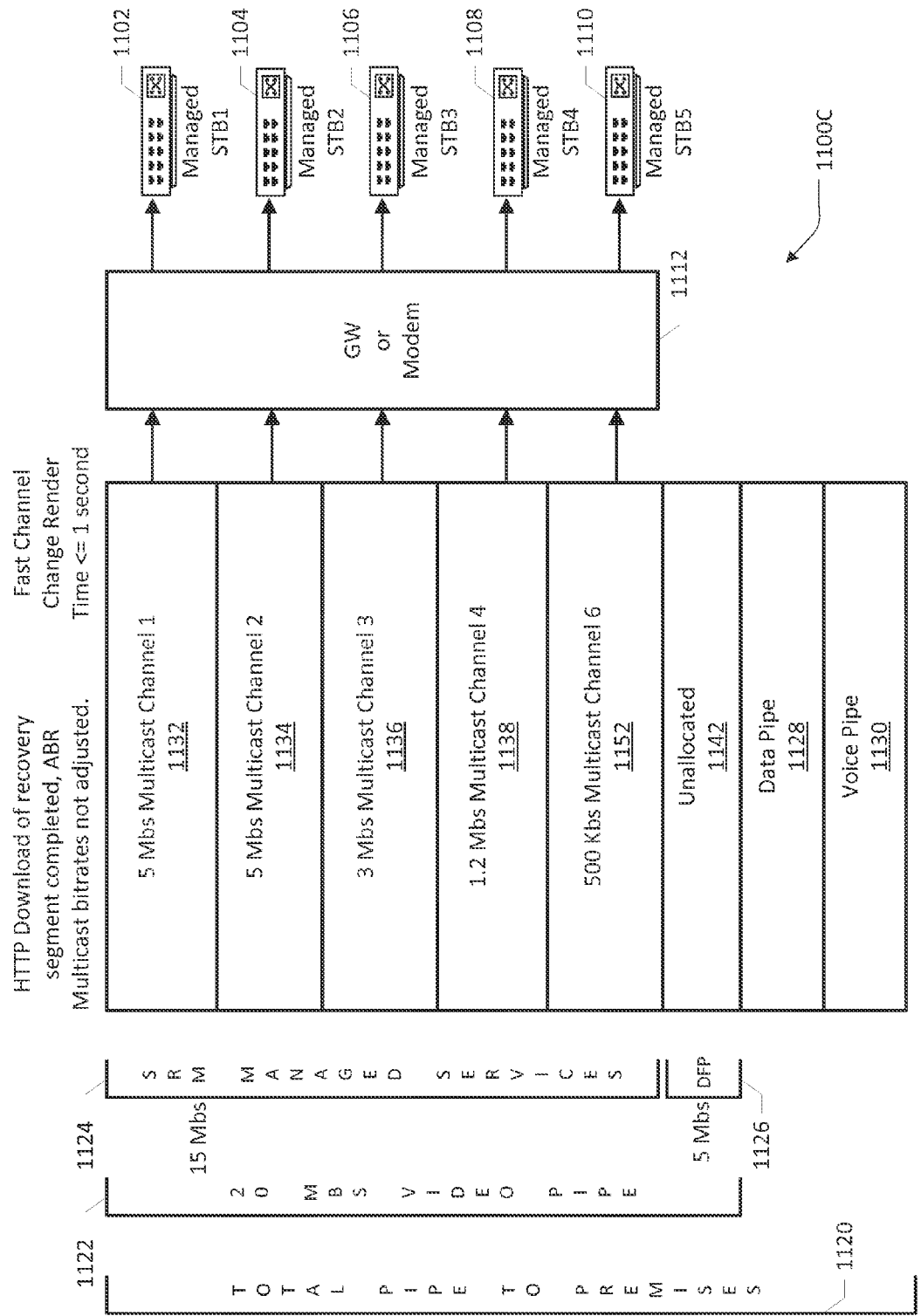

FIGS. 11A-11C depict bandwidth allocation of a streaming bandwidth pipe in one example scenario in response to a channel change request from a subscriber station. A total bandwidth pipe 1120 to a subscriber premises via premises node 1112 may include a data pipe 1128 and a voice pipe 1130, and may further comprise a 20 Mbs of video pipe 1122, of which a managed video streaming pipe 1124 of 15 Mbs is operative to serve STBs 1102 to 1110 via five multicast channels as managed services provided under a Session Resource Management (SRM): Channel 1 of 5 Mbs 1132 to STB 1102; Channel 2 of 5 Mbs 1134 to STB 1104; Channel 3 of 3 Mbs 1136 to STB 1106; Channel 4 of 1.2 Mbs 1138 to STB 1108; and Channel 5 of 500 Kbs 1140 to STB 1110. A dedicated FCC pipe (DFP) of 5 Mbs 1126 is provisioned for effectuating channel changes according to the teachings herein, with a CC render time of less than or equal to 1 second. Reference numeral 1100A in FIG. 11A refers to the initial scenario before a channel change is requested, wherein the full bandwidth of DFP 1126 remains as an unallocated portion 1142. Reference numeral 1100B in FIG. 11B refers to a CC scenario wherein STB 1110 requests to change its channel from Channel 5 to Channel 6 at 500 Kbs 1152. Because the requested channel (i.e., Channel 6) is a 500 Kbs service, the entire FCC pipe can be used for downloading a recovery segment for a rapid channel changing operation, wherein using all of 5 Mbs FCC pipe in the case of a 1-second segment duration yields a CC render time of only 0.1 second (500 Kbs/5 Mbs). It should be appreciated that for segments having different durations, corresponding different downloading speeds (higher or lower) may be achieved for given bandwidth constraints and bitrates. In the example scenario of FIG. 11B, for a 1-second recovery segment download, the entire FCC pipe may be in a fully allocated condition 1154 during the channel change for a period of 0.1 second, which is well within example operator CC render time requirements of 1 second. FIG. 11C shows the post-CC scenario 1100C wherein the HTTP recovery segment downloading has completed, thereby releasing the FCC pipe's bandwidth to an unallocated state 1142. Because the requested Channel 6 is a 500 Kbs service that could be accommodated within the bandwidth constraints while meeting the CC render time, no bandwidth (re)allocation or (re)adjustment is needed.

Figure 12A:
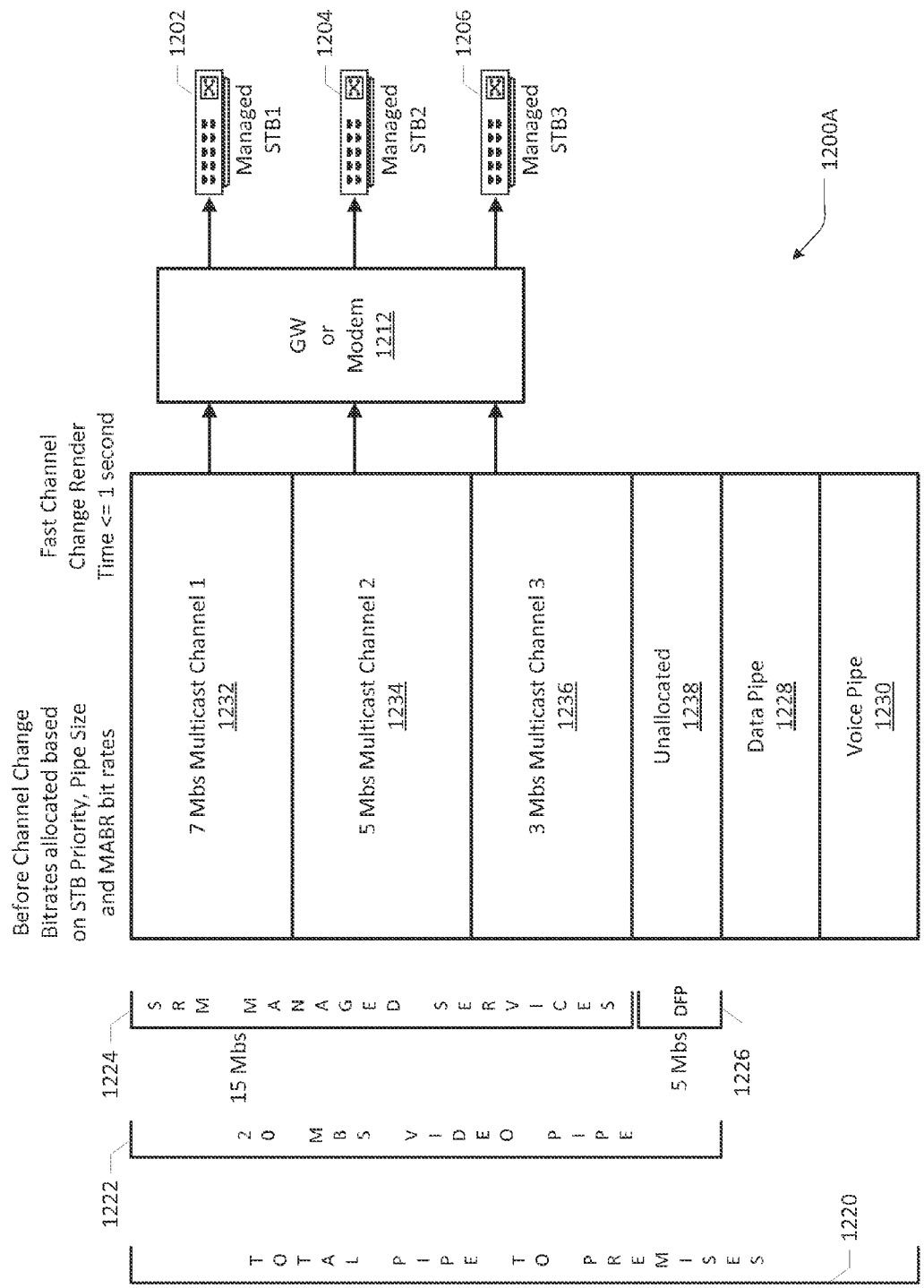
FIGS. 12A-12C depict bandwidth allocation of a streaming bandwidth pipe in another example scenario in response to a channel change request from a subscriber station.
Figure 12B:
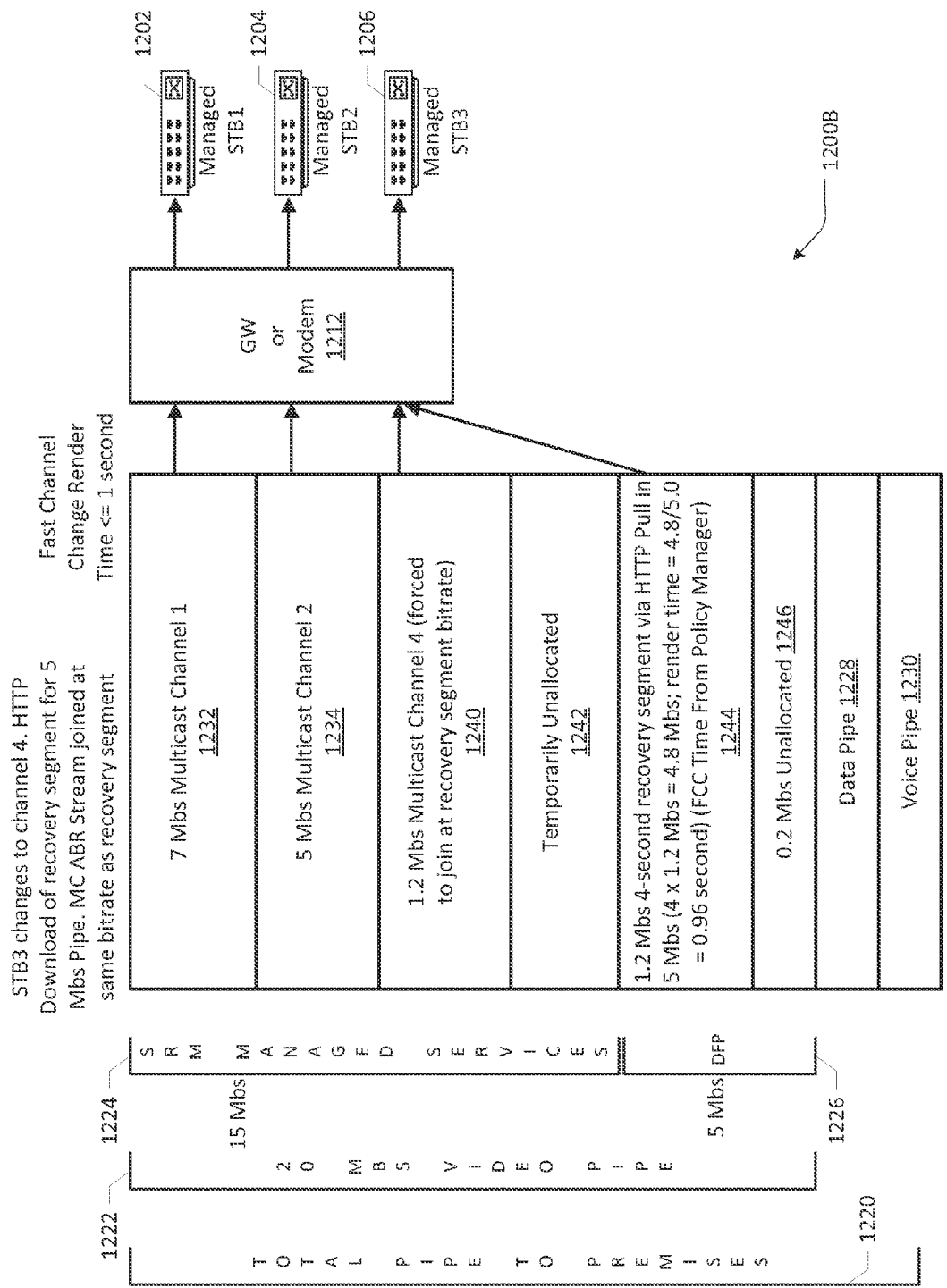
Figure 12C:
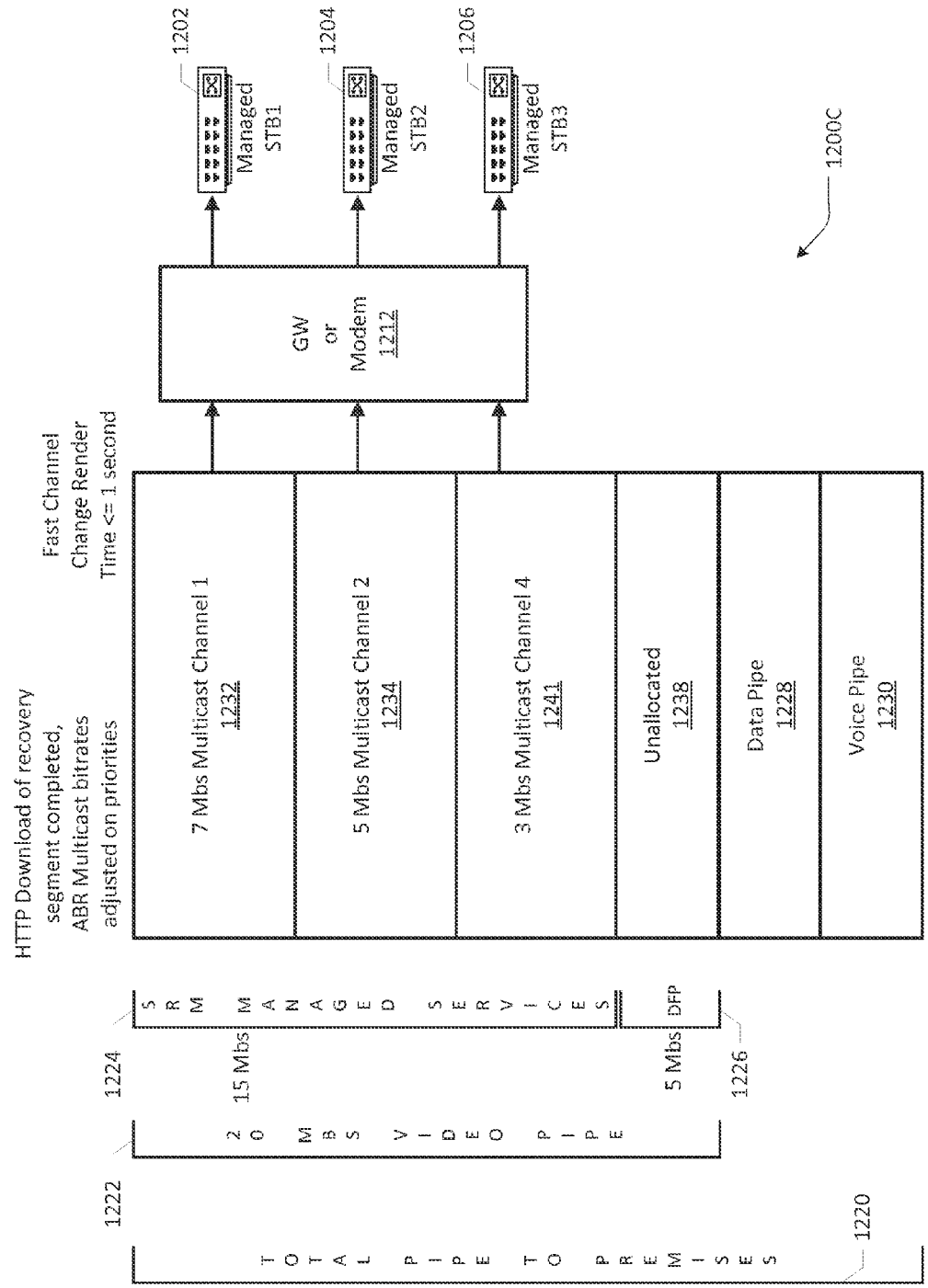

FIGS. 12A-12C depict bandwidth allocation of a streaming bandwidth pipe in another example scenario in response to a channel change request from a subscriber station wherein the requested channel is at a higher bitrate quality. Similar to the scenario sequence set forth above, a total bandwidth pipe 1220 to a subscriber premises via premises node 1212 may include a data pipe 1228 and a voice pipe 1230, and may further comprise a 20 Mbs of video pipe 1222, of which a managed streaming video pipe 1224 of 15 Mbs is operative to serve three STBs 1202, 1204, 1206 via three multicast channels: Channel 1 of 7 Mbs 1232 to STB 1202; Channel 2 of 5 Mbs 1234 to STB 1204; and Channel 3 of 3 Mbs 1236 to STB 1206. A dedicated FCC pipe (DFP) of 5 Mbs 1226 is provisioned similarly for effectuating channel changes, with a CC render time of less than or equal to 1 second. Reference numeral 1200A in FIG. 12A refers to the initial scenario before a channel change is requested, wherein the full bandwidth of DFP 1226 remains as an unallocated portion 1238. Reference numeral 1200B in FIG. 12B refers to a CC scenario wherein STB 1206 requests to change its channel from Channel 3 to Channel 4. Because the requested channel (i.e., Channel 4) is a 3 Mbs service, to fit an example 4-second recovery segment in the FCC pipe of 5 Mbs would require initially using a lower bitrate representation of Channel 4 for joining. Accordingly, an optimal bitrate computation process may be performed to determine that a bitrate of 1.2 Mbs can be accommodated within the FCC pipe (since a 4-second recovery segment at 1.2 Mbs results in a bandwidth consumption of 4.8 Mb which is within the 5 Mbs constraint, which takes a delivery time of 4.8/5=0.96 seconds that is less than 1 second CC render time requirement). As a result, Channel 4 is forced to join initially at 1.2 Mbs via pipe 1240, giving rise to a temporarily unallocated portion 1242 (of 1.8 Mbs) in the managed streaming video pipe 1224. At the same time, a 4.8 Mbs portion 1244 of the FCC pipe 1226 is allocated for effectuating the 4-second recovery segment delivery while a 0.2 Mbs portion 1246 remains unallocated. It should be appreciated that a bandwidth-constrained bitrate at which a switching channel may be joined (illustrated in FIG. 12B) may also depend on the point in the video segment sequence at which a join is taking place. If the joining is taking place that requires less segment data to recover, a higher bitrate stream may be joined than in the case where more segment data is to be recovered. After the completion of Channel 4 joining, the recovery segment downloading is terminated and a bandwidth (re)allocation process (re)adjusts the bitrate quality of Channel 4 to full 3 Mbs, as exemplified by portion 1241 in FIG. 12C. Since the HTTP pull process is no longer active, the FCC pipe's bandwidth is restored to full 5 Mbs, in an unallocated state 1238, as shown in the scenario 1200C of FIG. 12C.

Figure 13:
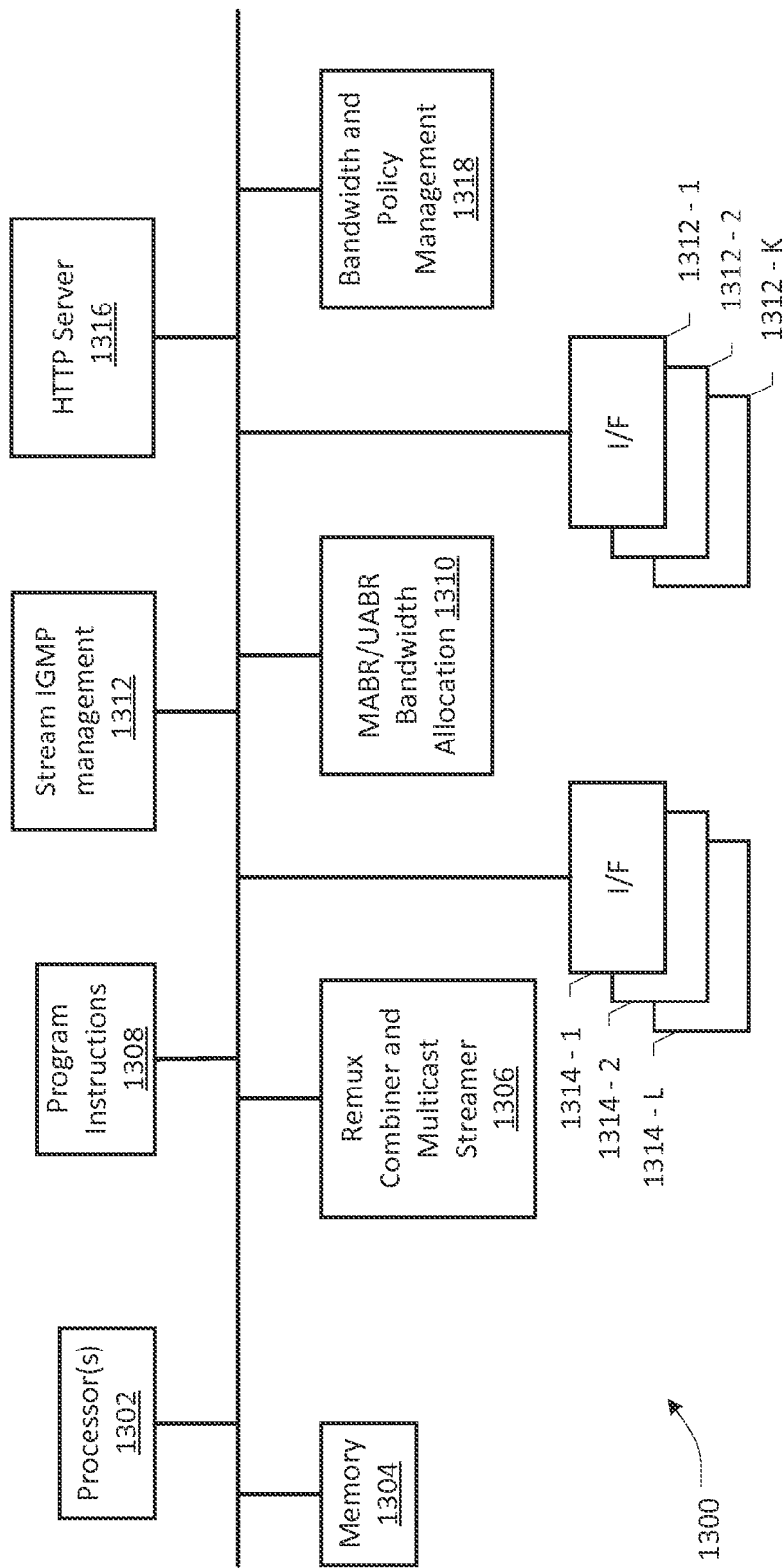
FIG. 13 depicts a block diagram of an example apparatus operative as an MVMA node in an MABR communications network of FIG. 1A or FIG. 1B according to an embodiment of the present patent application.

FIG. 13 depicts a block diagram of an apparatus 1300 that may be configured as an MVMA node operative in an MABR communications network of FIG. 1A or FIG. 1B according to an embodiment of the present patent application. One or more processors 1302 may be operatively coupled to various modules that may be implemented in persistent memory for executing suitable program instructions or code portions with respect to one or more processes set forth hereinabove for facilitating channel re-muxing, channel stitching, de-gapping, and/or bandwidth allocations, etc., depending on a particular configuration. A stream IGMP management module 1312 is operative to perform various processes for generating appropriate signals to an IGMP switch or a premises gateway node for joining the requested channels in accordance with the teachings set forth hereinabove. A remux combiner and multicast streamer 1306 is operative to de-gap and stitch the multicast channel streams for injecting into downstream communication paths at configured multicast addresses. A MABR bandwidth allocation module or UABR bandwidth allocation module 1310 is operative to apply suitable bandwidth allocation policies to a subscriber premises pipe as necessary under suitable program instructions, e.g., program instructions 1308 and/or other code portions in memory 1304, or in conjunction with a bandwidth policy manager 1318. A suitable segment cache may also be provided as part of the memory system of the apparatus. Further, the arrangement shown in FIG. 13 may be (re)configured as an FCC HTTP delivery processor in certain embodiments, suitably modified as needed. An HTTP server 1316 may be provided in an arrangement for effectuating progressive ABR download pulls with respect to one or more ABR client devices. Appropriate interfaces (I/F) 1314-1 to 1314-L are operative to effectuate communications with FCC HTTP delivery processing entities, SAG units and/or MSF functionalities, Session Resource Management (SRM) nodes, IGMP switches, unicast switches, and the like. In similar fashion, interfaces 1312-1 to 1312-K are operative to effectuate communications with a plurality of STBs and other client devices (in a gateway agent implementation, for example) via a suitable premises network as set forth in FIG. 1B.

Figure 14:
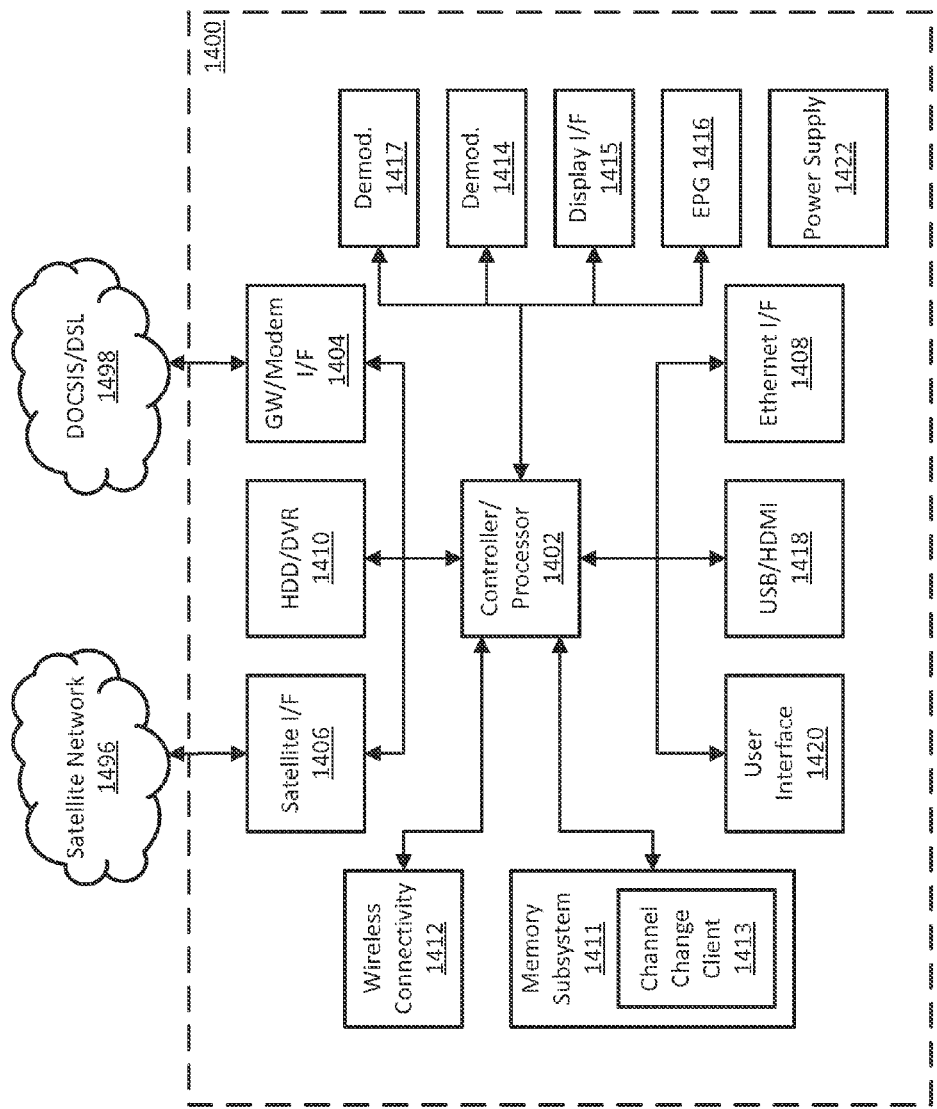
FIG. 14 depicts a block diagram of an example subscriber station (e.g., STB) according to an embodiment of the present patent application.

FIG. 14 depicts a block diagram of an example subscriber station (e.g., STB) 1400 according to an embodiment of the present patent application. STB 1400 is generally representative of subscriber stations 104-1 to 104-N shown in FIG. 1A or 1B, and may include appropriate hardware/software components and subsystems configured for performing any of the device-side processes (either individually or in any combination thereof) with respect to generating channel change requests and receiving appropriate responses described hereinabove. One or more microcontrollers/processors 1402 are provided for the overall control of the subscriber device 1400 and for the execution of various stored program instructions embodied in a persistent memory 1413 as channel change client that may be part of a memory subsystem 1411 of the subscriber device 1400. Controller/processor complex referred to by reference numeral 1402 may also be representative of other specialty processing modules such as graphic processors, video processors, digital signal processors (DSPs), and the like, operating in association with suitable video and audio interfaces (not specifically shown). Appropriate interfaces such as I/F modules 1404 and 1406 involving or operating with tuners, demodulators, descramblers, MPEG/H.264/H.265 decoders/demuxes may be included for processing and interfacing with multicast IPTV and other content signals received via a DSL/CMTS network 1498 or a satellite network 1496. Example demodulators including NTSC demodulator 1414 and ATSC/PAL demodulator 1417, etc., may also be provided. Other I/O or interfaces such as a display interface 1415, Electronic Program Guide (EPG) 1416 for identifying service channels, user interface 1420, USB/HDMI ports 1418, Ethernet I/F 1408, and short-range and wide area wireless connectivity interfaces 1412 are also provided. A hard disk drive (HDD) or DVR system 1410 may be included for mass storage of all sorts of program assets such as NV media, TV shows, movie titles, multimedia games, etc. Also included in STB 1400 is a suitable power supply block 1422, which may include AC/DC power conversion to provide power for the device 1400. It should be appreciated that the actual power architecture for the subscriber device 1400 may vary by the hardware platform used, e.g., depending upon the core SoC (System on Chip), memory, analog front-end, analog signal chain components and interfaces used in the specific platform, and the like.

Based upon the foregoing Detailed Description, it should be appreciated that one or more embodiments of the present disclosure can be advantageously implemented in a number of multicast environments, including multi-bitrate adaptive networks as well as single-bitrate multicast networks, for effectuating a more satisfactory channel changing experience using the bandwidth-optimized recovery segment pulls set forth herein. One skilled in the art will recognize that because HTTP is used for recovery segment delivery, the bandwidth allocated for such delivery can be readily controlled and customized. Whereas in the current state of affairs a channel change must wait until the next new segment appears (which might be seconds), HTTP delivery-based recovery segment data according to embodiments herein facilitates faster rendering of the content of the new channel.

In the above-description of various embodiments of the present disclosure, it is to be understood that the terminology used herein is for the purpose of describing particular embodiments only and is not intended to be limiting of the invention. For example, in an alternative embodiment, the recovery segment that is being downloaded from an FCC server may be a segment just before (e.g., immediately prior to) the segment currently being transmitted via multicast. That is, the recovery segment in this embodiment is Segment (N−1) whereas the current Segment N is being transmitted. It should be appreciated that in such an arrangement, there may not be a need for a 1-segment cache in the SAG unit of an MABR network while the FCC server may still be provided with a recovery segment cache for purposes of the present patent application, with suitable modifications mutatis mutandis. Also, unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and may not be interpreted in an idealized or overly formal sense expressly so defined herein.

At least some example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, so that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). Additionally, the computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

As alluded to previously, tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray). The computer program instructions may also be loaded onto or otherwise downloaded to a computer and/or other programmable data processing apparatus to cause a series of operational steps to be performed on the computer and/or other programmable apparatus to produce a computer-implemented process. Accordingly, embodiments of the present invention may be embodied in hardware and/or in software (including firmware, resident software, micro-code, etc.) that runs on a processor or controller, which may collectively be referred to as "circuitry," "a module" or variants thereof. Further, an example processing unit may include, by way of illustration, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. As can be appreciated, an example processor unit may employ distributed processing in certain embodiments.

Further, in at least some additional or alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Furthermore, although some of the diagrams include arrows on communication paths to show a primary direction of communication, it is to be understood that communication may occur in the opposite direction relative to the depicted arrows. Finally, other blocks may be added/inserted between the blocks that are illustrated.

It should therefore be clearly understood that the order or sequence of the acts, steps, functions, components or blocks illustrated in any of the flowcharts depicted in the drawing Figures of the present disclosure may be modified, altered, replaced, customized or otherwise rearranged within a particular flowchart, including deletion or omission of a particular act, step, function, component or block. Moreover, the acts, steps, functions, components or blocks illustrated in a particular flowchart may be inter-mixed or otherwise inter-arranged or rearranged with the acts, steps, functions, components or blocks illustrated in another flowchart in order to effectuate additional variations, modifications and configurations with respect to one or more processes for purposes of practicing the teachings of the present patent disclosure.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. A method for changing channels in a multicast adaptive bitrate (MABR) communications network, the method comprising:
   receiving a channel change (CC) request from a set-top-box (STB) device disposed in a subscriber premises including a plurality of client devices to change to a target service channel provided as a plurality of MABR streams wherein each MABR stream corresponds to a particular bitrate representation of the target service channel;
   determining a select bitrate representation of the target service channel to which the requesting STB device is to be switched;
   generating a HyperText Transfer Protocol (HTTP) request to obtain a recovery segment from a cached storage, the recovery segment having a matching bitrate corresponding to the select bitrate representation of the target service channel;
   joining the requesting STB device to a multicast ABR stream having the select bitrate representation of the target service channel using the recovery segment downloaded from the cached storage, wherein the recovery segment is transmitted in a dedicated fast channel change (FCC) pipe portion of a subscriber premises bandwidth pipe allocated to the subscriber premises; and
   if the select bitrate representation of the target service channel is not at a correct bitrate quality provisioned for the requesting STB device, allocating or reallocating at least a portion of the bandwidth of the subscriber premises bandwidth pipe to ensure that the correct bitrate quality for the target service channel is reached.

2. The method as recited in claim 1, further comprising:
   identifying an optimal bitrate representation of the target service channel that allows switching to the target service channel at a highest possible bitrate quality while satisfying a channel change render time threshold within the dedicated FCC pipe portion's bandwidth constraints and choosing the optimal bitrate representation as the select bitrate representation;
   receiving the recovery segment corresponding to the select bitrate representation from the cached storage associated with a channel change processing element via an HTTP download operation and providing it to a MABR remux entity for immediate transmission to the requesting STB device;
   receiving a gapped stream of the select bitrate representation of the target service channel from a segmentation and gapping (SAG) unit and at a matching time code reference point between the recovery segment and the gapped stream of the select bitrate representation, terminating the HTTP download operation of the recovery segment and joining the gapped stream of the select bitrate representation; and de-gapping the joined gapped stream of the select bitrate representation for transmission to the requesting STB device.

3. The method as recited in claim 2, wherein the matching time code reference point comprises a program clock reference (PCR) common to the recovery segment and a particular segment of the gapped stream of the select bitrate representation during which channel changing is effectuated.

4. The method as recited in claim 3, wherein the HTTP request is configured to specify the PCR in the recovery segment at which the HTTP download operation is to be terminated.

5. The method as recited in claim 3, wherein the HTTP download operation is terminated by issuing an out-of-band signaling message that is configured to specify a source port, a destination port and the PCR in the recovery segment at which the HTTP download operation is to be terminated.

6. The method as recited in claim 2, wherein the HTTP download operation is terminated by closing a socket used for receiving the recovery segment immediately after the matching time code reference point has been identified.

7. The method as recited in claim 1, wherein the target service channel comprises media content encoded using one of a Moving Pictures Expert Group (MPEG) codec, an MPEG-2 codec, an MEPG-4 codec, an H.264 codec, and an H.265 codec.

8. The method as recited in claim 1, wherein the correct bitrate quality provisioned for the requesting STB device is based on a bandwidth allocation process responsive to a priority weight associated with the requesting STB device.

9. The method as recited in claim 1, wherein the recovery segment comprises a segment immediately prior to the segment of the select bitrate representation being currently transmitted.

10. The method as recited in claim 1, wherein the recovery segment comprises a segment identical to the segment of the select bitrate representation being currently transmitted.

11. An apparatus for effectuating channel changes in a multicast adaptive bitrate (MABR) communications network, the apparatus comprising:

a segmentation and gapping (SAG) unit configured to receive a plurality of encoded MABR streams for each service channel from an MABR encoder operative to receive a plurality of service channels, wherein each encoded MABR stream corresponds to a particular bitrate representation of a specific service channel, the SAG unit further operative to generate a segmented and gapped MABR stream for each encoded MABR stream of each service channel;

a channel change processing element operative to receive the plurality of encoded MABR streams and configured to store recovery segments in a cache for each bitrate representation of each service channel, wherein each recovery segment corresponds to a segment of each bitrate representation of each service channel being multicast from the SAG unit; and an ABR video management agent configured to receive the segmented and gapped MABR streams for each service channel, the ABR video management agent further operative to:

responsive to receiving a channel change (CC) request from a set-top-box (STB) device disposed in a subscriber premises including a plurality of client devices to change to a target service channel, determine a select bitrate representation of the target service channel to which the requesting STB device is to be joined;

generate a HyperText Transfer Protocol (HTTP) request to the channel changing processing element to obtain a recovery segment corresponding to a particular segment of the select bitrate representation of the target service channel;

join the requesting STB device to the select bitrate representation of the target service channel using the recovery segment downloaded from the channel change processing element's cache, wherein the recovery segment's data is transmitted in a dedicated fast channel change (FCC) pipe portion of a subscriber premises bandwidth pipe allocated to the subscriber premises; and if the select bitrate representation of the target service channel is not at a correct bitrate quality provisioned for the requesting STB device, allocate or reallocate at least a portion of the bandwidth of the subscriber premises bandwidth pipe to ensure that the correct bitrate quality for the target service channel is reached.

12. The apparatus as recited in claim 11, wherein the ABR video management agent is configured to operate at a network node upstream from an Internet Group Management Protocol (IGMP) router of the MABR communications network.

13. The apparatus as recited in claim 12, wherein the ABR video management agent is configured as a virtual machine operating at the network node.

14. The apparatus as recited in claim 11, wherein the ABR video management agent is configured to operate at a premises node associated with the subscriber premises, the premises node comprising one of a Digital Subscriber Line (DSL) gateway and a Data Over Cable Service Interface Specification (DOCSIS)-compliant cable modem.

15. The apparatus as recited in claim 11, wherein the ABR video management agent is further configured to:

identify an optimal bitrate representation of the target service channel that allows switching to the target service channel at a highest possible bitrate quality while satisfying a channel change render time threshold within the dedicated FCC pipe portion's bandwidth constraints and choosing the optimal bitrate representation as the select bitrate representation;

receive the recovery segment corresponding to the select bitrate representation from the channel change processing element's cache via an HTTP download operation and provide it to a MABR remux entity for immediate transmission to the requesting STB device;

receive a gapped stream of the select bitrate representation of the target service channel from a segmentation and gapping (SAG) unit and at a matching time code reference point between the recovery segment and the gapped stream of the select bitrate representation, terminate the HTTP download operation of the recovery segment and join the gapped stream of the select bitrate representation; and de-gap the joined gapped stream of the select bitrate representation for transmission to the requesting STB device.

16. The apparatus as recited in claim 15, wherein the matching time code reference point comprises a program clock reference (PCR) common to the recovery segment and a particular segment of the gapped stream of the select bitrate representation during which channel changing is effectuated.

17. The apparatus as recited in claim 16, wherein the ABR video management agent is further operative to issue the HTTP request configured to specify the PCR in the recovery segment at which the HTTP download operation is to be terminated.

18. The apparatus as recited in claim 16, wherein the ABR video management agent is further operative to issue an out-of-band signaling message configured to specify a source port, a destination port and the PCR in the recovery segment at which the HTTP download operation is to be terminated.

19. The apparatus as recited in claim 15, wherein the ABR video management agent is further operative to terminate the HTTP download operation by closing a socket used for receiving the recovery segment immediately after the matching time code reference point has been identified.

20. The apparatus as recited in claim 11, wherein the MABR encoder is operative to receive channel source feeds of media content encoded using one of a Moving Pictures Expert Group (MPEG) codec, an MPEG-2 codec, an MEPG-4 codec, an H.264 codec, and an H.265 codec.

21. The apparatus as recited in claim 11, wherein the ABR video management agent is further configured to effectuate a bandwidth allocation process responsive to a priority weight associated with the requesting STB device to reach the correct bitrate quality provisioned for the requesting STB device with respect to the target service channel.

22. The apparatus as recited in claim 11, wherein the recovery segment comprises a segment immediately prior to the segment of the select bitrate representation being currently transmitted.

23. The apparatus as recited in claim 11, wherein the recovery segment comprises a segment identical to the segment of the select bitrate representation being currently transmitted.

* * * * *